United States Patent [19]
Furuya et al.

[11] Patent Number: 6,081,375
[45] Date of Patent: Jun. 27, 2000

[54] MULTISCREEN DISPLAY FORMED OF PROJECTION UNITS ARRANGED IN THE VERTICAL AND HORIZONTAL DIRECTIONS

[75] Inventors: Keizo Furuya, Saitama-ken; Kazuhiko Nakao; Hideyuki Horie, both of Chiba-ken, all of Japan

[73] Assignee: Kabushiki Kaisha Toshiba, Kawasaki, Japan

[21] Appl. No.: 08/934,760

[22] Filed: Sep. 22, 1997

Related U.S. Application Data

[63] Continuation of application No. 08/326,370, Oct. 20, 1994, abandoned.

[30] Foreign Application Priority Data

| | | | |
|---|---|---|---|
| Oct. 21, 1993 | [JP] | Japan | 5-263643 |
| Dec. 24, 1993 | [JP] | Japan | 5-328908 |
| Mar. 31, 1994 | [JP] | Japan | 6-087886 |
| Jun. 24, 1994 | [JP] | Japan | 6-143587 |

[51] Int. Cl.[7] .......................... G03B 21/56; G03B 21/58; G03B 21/30
[52] U.S. Cl. .............................. 359/460; 353/72
[58] Field of Search ................. 359/449, 443, 359/460; 353/119, 72, 100, 101; 348/788, 787, 789, 785, 525, 527, 836

[56] References Cited

U.S. PATENT DOCUMENTS

| | | |
|---|---|---|
| 3,036,496 | 5/1962 | Frederick, Jr. et al. ............ 88/24 |
| 3,205,771 | 9/1965 | Harrison et al. .................... 88/24 |
| 3,352,203 | 11/1967 | Barke et al. ........................ 88/24 |
| 3,544,208 | 12/1970 | Wasson ............................... 353/101 |
| 3,882,269 | 5/1975 | Niehaus .............................. 178/6.6 R |
| 4,394,681 | 7/1983 | Rowe .................................. 358/60 |
| 4,479,144 | 10/1984 | Yamazaki et al. .................. 358/60 |
| 4,866,530 | 9/1989 | Kalua . | |
| 5,206,760 | 4/1993 | Nakashima et al. ............... 359/457 |
| 5,249,005 | 9/1993 | Furuno ............................... 353/94 |
| 5,363,149 | 11/1994 | Furuno et al. ..................... 348/789 |
| 5,382,990 | 1/1995 | Hata et al. .......................... 353/94 |
| 5,400,178 | 3/1995 | Yamada et al. .................... 359/449 |
| 5,408,283 | 4/1995 | Lee ..................................... 353/77 |
| 5,461,510 | 10/1995 | Vilnes ................................ 359/449 |
| 5,510,862 | 4/1996 | Lieberman et al. ............... 353/119 |
| 5,654,776 | 8/1997 | Furuya ............................... 348/789 |

FOREIGN PATENT DOCUMENTS

| | | |
|---|---|---|
| 329295 | 5/1976 | Austria . |
| 0523427 | 1/1993 | European Pat. Off. . |
| 5-50446 | 7/1993 | Japan . |
| 5-55673 | 7/1993 | Japan . |
| 2248005 | 3/1992 | United Kingdom . |

*Primary Examiner*—Safet Metjahic
*Assistant Examiner*—Christopher E. Mahoney
*Attorney, Agent, or Firm*—Pillsbury Madison & Sutro LLP

[57] ABSTRACT

Respective unit displays forming a multiscreen display are divided into two halves: a front half cabinet containing a screen part, and a rear half cabinet containing a light box part. During use, rear half cabinet is fixed relative to a predetermined position in the front half cabinet. During shipping and storing, the rear half cabinet can be contained in the front half cabinet. Further, in fitting the screen, the screen is fixed as it is pressed against the fitting frame using wires, or the Fresnel lenses forming the screen are fitted to the fitting frames for the respective projecting units.

6 Claims, 39 Drawing Sheets

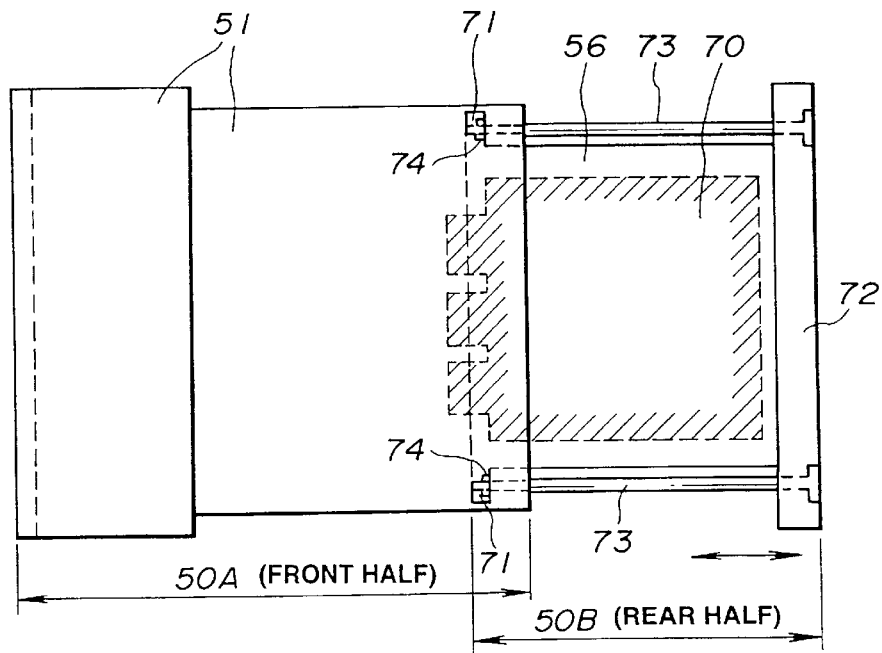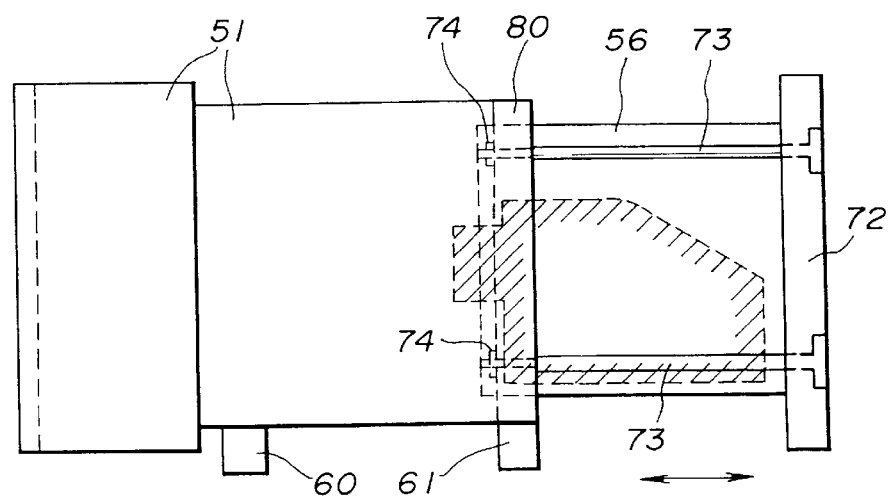

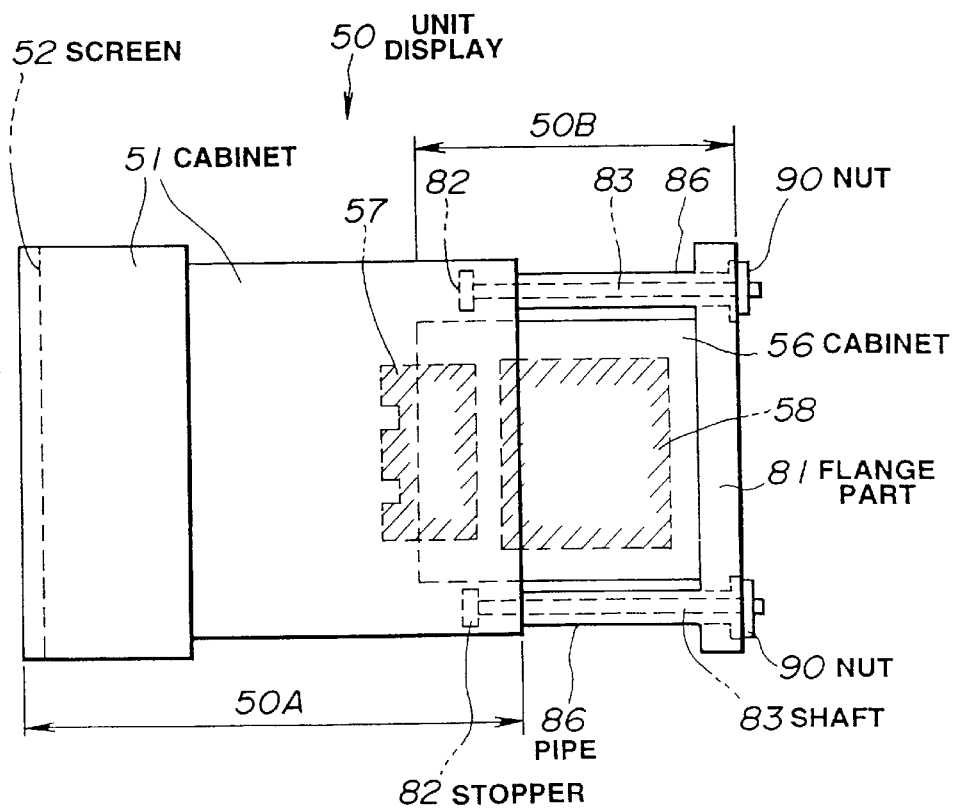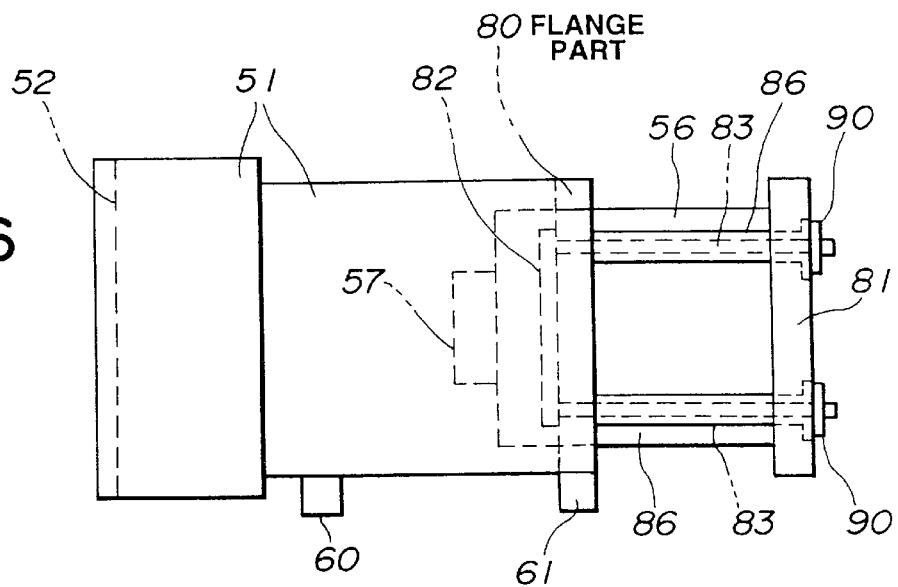

MULTISCREEN DISPLAY FORMED OF PROJECTION UNITS ARRANGED IN THE VERTICAL AND HORIZONTAL DIRECTIONS

This application is a continuation of Ser. No. 08/326,370 Oct. 20, 1994 abandoned.

BACKGROUND OF THE INVENTION

1. Field of the Invention

This invention relates to a wide-screened multiscreen display made by heaping a plurality of unit displays (called also, cube projection displays) in vertical and horizontal directions and a process for assembling the same. Through this display and process the operations of conveying and stacking the cabinets of respective unit displays and the operations of the adjustment and maintenance after stacking the cabinets may be efficient, the space efficiency in conveying and storing the cabinets may be improved, and the width of the boundary (joint width) between the screens of the respective unit displays may be made small.

2. Description of the Related Arts

Conventional multiscreen displays are of a front surface projecting type, and a back surface projecting type. In the front surface projecting type displays, an image light from a projecting unit is projected from the front surface of the screen. In the back surface projecting type displays, an image light is projected from the back surface of the screen. The back surface type multiscreen display which is low in the influence of the surrounding light is generally prevalent. In such back surface type multiscreen display, he screen is divided vertically and horizontally to define a plurality of zones so that image lights from a plurality of projecting units may be projected onto the respective plurality of zones. As such, one image may be displayed on multiply zones, or one image may be displayed as divided into a plurality of images that are displayed respectively on the plural zones.

The conventional multiscreen display can be formed to obtain a large picture screen by arranging a plurality of (9 in the drawing) unit displays 1 in the vertical and horizontal directions, as shown in FIG. 53.

FIG. 54 shows an appearance view of an example of the unit display. FIG. 55 shows a vertically sectioned view of the same.

As shown in these figures, the unit display 1 has a screen fitting frame 4 arranged on the front surface of a cabinet 2. The unit display is formed by containing within the cabinet 2 a screen 3 and light box parts consisting of optical system parts 5 for projecting an image light onto the back surface of the screen 3 and a chassis part 6. Connecting metal fixtures 7 and 8 are fitted on the upper and lower surfaces of the outside of the cabinet 2 for fixing the respective upper and lower unit displays 1 with each other when a plurality of unit displays 1 are stacked up in multiple steps. The above mentioned screen 3 is formed of a Fresnel lens 3B on the inner surface side and a lenticular lens 3A on the front surface side.

FIG. 56 shows an example of the above mentioned unit displays as stacked up in steps. The upper and lower unit displays 1 are connected with each other through bolts 9 by connecting metal fixtures 7 and 8 arranged above and below the respective cabinets.

When connecting the unit displays in a vertically stacked manner as discussed above, the entire cabinet will have to be lifted and connected above and below while being fitted in the fixed position, creating danger due to the heavy labor involved. Also, during this connection and positioning the heavy object may have to be slid in small increments toward the front, rear, right and left to obtain a precise fit, taking a long time.

Further, when multiple unit displays are stacked in the vertical direction, weight of the units will reduce the size of the gap between them. But due to the weight of those units, a gap between the units will likely be produced in the horizontal direction as is shown in FIG. 57 by gap A.

Even when the outer peripheral angles 10 and 11 are combined via a bolt (indicated by the arrow) from outside, it is difficult to perfectly eliminate the gap A in such an arrangement.

The above-described problem will occur when the weight of the unit display 1 is heavy, its contour is large and the unit display 1 is connected or fastened from outside the cabinet. As a result, the quality of the multi-picture will be deteriorated.

Further, when the unit displays are incrementally stacked in steps, it is necessary to use a machine such as a crane. Use of such a machine requires that the internal space of the installing place is wide.

Also, the depth and contour of the cabinet is large, and the conveying efficiency is low. As a multi-picture is made, many unit displays as 4, 9 or 16 units will be conveyed at once. Therefore, when a multi-picture display is made, the volume of each unit display must be reduced to elevate the conveying efficiency. (There will be a case that they can not be conveyed at once.)

Operations such as adjusting the chassis and optical system that are performed after the units are stacked, and the operations such as replacing deteriorated internal parts during service are all made from the back surface side.

When the cabinet is used with a multi-picture for a long time, dust will be often deposited on the front surface and back surface of the screen. It is difficult and convenient to wipe off this dust when the cabinet is deep as it has been in the past. That is, if the light box part is intended to be pulled out and wiped, it will be difficult and inconvenient for the hand to reach the part.

As discussed above, the assembling operation required for incrementally stacking unit displays when making a multi-screen type displays is dangerous and complicated, a wide space is required for the installing place, and it is difficult to get the installing precision. Further, because the contour of each unit used to make the display is so large, the conveying efficiency is low and it is inconvenient to perform service or the like on the units.

FIG. 58 shows a formation of another example of the unit display 1. FIG. 59 shows a partly sectioned view in line 59—59 in FIG. 58.

In each unit display 1, as shown in FIG. 58, a rear projector 12 is arranged within a cabinet 2, the peripheral edge of a screen 3 is pressed with a screen fitting frame 4 on the front side of the cabinet 2, and the periphery of the screen 3 is pressed with an L-shaped metal fixture 13. The screen fitting frame 4 is secured so as to be integral with the cabinet 2.

As shown in FIG. 59, the screen 3 is a Fresnel lens 3B on the back surface and a lenticular lens 3A on the front surface so that lights may be once collected by the Fresnel lens 3B and then divided on the right and left by the lenticular lens. When the screen 3 is dropped into the screen fitting frame 4 and is pressed against and fixed to the front end part (receiving part) of the cabinet 2 with the L-shaped metal fixture 13, the screen 3 will be fitted. Then, the L-shaped metal fixture 13 will be fixed to the screen fitting frame 4 with screws 14 so that the screen 3 may not be removed.

Now, the above mentioned screen 3 fixing method has the following defects (1) to (3):

(1) As the screws 14 are used to fit the L-shaped metal fixture 13 to the screen fitting frame 4, the thickness L1 of the screen fitting frame 4 will require the thickness of the screw part.

(2) Also, because the L-shaped metal fixture 13 holds the screen 3 only on the outer periphery, when the screen fitting frame 4 is instantaneously transformed to be diamond-shaped by an external force (particularly in the diagonal direction) during conveyance or handling, the screen 3 will be likely to be disengaged out of the L-shaped metal fixture 13. Particularly, because the lenticular lens 3A is thinner than the Fresnel lens 3B, that the lenticular lens 3A part will likely be disengaged out of the L-shaped metal fixture. Therefore, the dimension L2 of the L-shaped metal fixture 13 must be at least wider than the dimension L3 of the screen receiving part of the cabinet 2. In order that the screen 3 may not be disengaged out of the screen fitting frame 4, the dimension L2 of the L-shaped metal fixture 13 must be increased and, at the same time, the dimension L3 on the cabinet 2 side must also be increased to be as large as L2. Further, the transformation of the central part of the screen 3 is provided with no inhibiting force and is left free. For example, even if the L-shaped metal fixture 13 is replaced with a smaller one after the display has been installed in a set place, the dimension L3 on the cabinet 2 side and the dimension L1 on the screen fitting frame 4 side will still remain large and, as a result, when the unit displays are incrementally stacked in steps, the effective picture will be small.

From the above, the dimension L4 of the peripheral edge of the screen 3 will become very large and, when the unit displays 1 are incrementally stacked in several steps as in FIG. 53 to be of a multiscreen type, the width M of the joint by the combination will become large, the information amount of the picture will become small and, at the same time, the picture will become distorted.

(3) In addition, in the multiscreen display, in order to elevate the quality of the entire picture, the linearity of the convergence must be adjusted between the respective unit displays 1. However, there is nor criterion in such adjustment.

FIG. 60 is a perspective view of another conventional example of the multiscreen display. FIG. 61 is a sectioned view on line 61—61 of FIG. 60.

In FIG. 60, a screen 16 is arranged on the front surface of a cabinet 15 and a plurality (four in the drawing) of rear projectors 12 are arranged within the cabinet 15. In this formation, as a method of eliminating the joint of the lenticular lenses, the rear projector 12 and screen 16 are separately made, only the screen 16 part is made a jointless formation of the lenticular lens and the plurality of rear projectors 12 are separately combined into a turret so that the optical axes of the Fresnel lenses of the screen may be aligned to be a multiscreen.

More specifically, with reference to FIG. 61, a plurality (four in the drawing) of the Fresnel lenses 16B corresponding to the respective rear projectors 12 are arranged in the rear of the lenticular lens 16, and are further lined with a thick strong transparent plate 16C (for example, an acrylic plate) (to function as a supporting plate) in the rear. The thick transparent plate 16C and a shielding plate 16D are jointed and fastened to be integral by inserting the thin shielding plate 16D between the end surfaces of the respective thick transparent plates 16C. The four Fresnel lenses 16B are held between lenticular lens 16A and this integral transparent plate 16C to form an integral screen of a multipicture. Then, the plurality of rear projectors 12 are arranged as combined in a turret by a separate body 17 so that the optical axes of the respective Fresnel lenses 16B may be aligned to make a multiscreen.

However, in the conventional apparatuses such as that shown in FIGS. 60 and 61, there are the following defects (1) to (3):

(1) A multiscreen that is formed of the lenticular lens 16A, Fresnel lens 16C and shielding plate 16D, is complicated and expensive.

(2) The Fresnel lens 16B is only inserted, is poor in the environmental stability, slips and deflects. (Therefore, as another countermeasure, a part of the Fresnel lens 16B is nailed to the transparent plate 16C with fine nails so as to be reinforced. However, a deflection (such as an environment variation difference by the plate thickness difference) will occur between the Fresnel lens 16B causing transparent plate 16 and the picture quality will reduced.

(3) Further, because the screen part and the rear projector 12 are separately assembled (installed) on the spot (in the setting place), it will be difficult to precisely align all optical axes when multidisplayed.

FIG. 62 shows another example of the screen fitting. In this example, one lenticular lens and a plurality of Fresnel lenses form an integral screen of a multipicture by using a fitting frame.

In FIG. 62, the reference numeral 20 represents a front surface part unit of a multiscreen display. In this front surface part unit 20, a screen 30 is fitted by a screen fitting frame 21.

In this screen, four upper, lower, left and right regions 31, 32, 33 and 34 are set, and image lights are projected from the four respective projecting units.

FIG. 63 is a sectioned view of the front surface part unit 20 in FIG. 62.

As shown in FIG. 63, in the screen 30 shown in FIG. 62, Fresnel lenses 37 are arranged in the four upper, lower, left and right regions 31, 32, 33 and 34 between the thickest transparent plate (such as, for example, an acrylic plate) 35 and the thinnest lenticular lens 36.

The Fresnel lenses 37 weaken the diffusion of the image lights from the respective plurality of the projecting units and lead them to the lenticular lens 36. The lenticular lens 36 forms a vertically striped lens on the front surface side of a semitransparent plate, images the image lights from the Fresnel lenses 37, and further diffuses them to the right and left. A black painting 38 is applied to the periphery of the Fresnel lens 37 to prevent the adjacent projecting units from interfering with lights.

FIG. 64 is an explanatory view for explaining to prevent the projecting units from interfering with image lights.

In FIG. 64, as lights are absorbed by the black painting 38 between the Fresnel lenses 37. When the projection of the image lights between the upper and lower (or right and left) projecting units is small, no interference with the image lights by different projecting units will occur because the black paint on the Fresnel lens border will stop such interference. However, because the transparent plate 35 is formed of one plate having no interior border upon which black paint may be placed, as shown by the solid lines B31 and B32, when the lag of the image lights from the projecting units is large, the image lights will cross the black painting 38 and an interference will occur. Therefore, the boundary line of the projected image will have to be controlled by controlling the luster size of the projecting unit and it will be a very difficult control in some signals having different frequency characteristics.

When the Fresnel lenses 37 are forcibly fixed to the transparent plate 35 with nails, the ratio of the expansion and contraction and the progressing velocity will be changed by the difference in plate thickness between the transparent plate 35 and the Fresnel lenses 37. As a result, a strain will be produced between the transparent plate 35 and the Fresnel lenses 37. Therefore this screen is useful only where little temperature variation is experienced, such as a room. In addition, as the four Fresnel lenses 37 are fixed into one, moving, conveying and installing is difficult. Further, as the transparent plate 35 and screen fitting frame 81 must have sufficient strength, they are heavy and the handlability will be lower.

SUMMARY OF THE INVENTION

An object of the present invention is to provide a multiscreen display and a process for assembling the same wherein the conveying operation, installing operation, adjusting operation and servicing operation after the installation are made efficient.

Another object of the present invention is to provide a multiscreen display wherein the dimensions of the parts for fixing the screen are kept minimum, and the screen holding force is improved. When unit displays are incrementally stacked in steps, the joint will be made minimum, the information amount of the picture will be made large and the distortion will be minimized the operability for the linearity adjustment of the convergence can be improved and the assembling operability is high when set.

Still another object of the present invention is to provide a multiscreen display wherein when the slip of the image lights from the projecting units is large, the interference with the image lights will be able to be prevented and, in case the picture is made large, the handlability will be able to be improved.

The first invention is a multiscreen display formed by arranging in the vertical and horizontal directions a predetermined number of unit displays containing within cabinets screen parts and light box parts expanding and projecting image lights to these screen parts, wherein the above mentioned unit displays are divided into a first part containing the above mentioned screen parts and a second part containing the above mentioned light box parts and further the above mentioned first part and second part are respectively provided with connecting part so as to be connectable with each other by a locking means.

According to the first invention, as the unit displays are divided into the first part and second part, the weight and volume will become half and the conveying operation, installing operation and the adjusting operation and servicing operation after the installing will be made safely and easily. Particularly, the first part composes only a screen part and other function parts are concentrated in the second part, the assembling operation can be made to eliminate the gap between the screens in stacking up the cabinets in steps to make a multiscreen with only the first part and the assembling operation can be made easy.

The second invention is a multiscreen display formed by arranging in the vertical and horizontal directions a predetermined number of unit displays containing within cabinets screen parts and light box parts expanding and projecting image lights to these screen parts, characterized by comprising:

a first cabinet containing the above mentioned screen parts;

a second cabinet containing the above mentioned light box parts, set so that the contour dimension may be smaller than the inside dimension of the above mentioned first cabinet and movable and containable inside the above mentioned first cabinet;

a plurality of shafts movable forward and rearward with respect to the above mentioned first cabinet;

a means provided at one end of said shaft to regulate the rearward movement;

a fixing means for passing and fixing the other end of the above mentioned shaft to the above mentioned second cabinet;

a guide means removably secured in the rear end part to the rear end of the above mentioned second cabinet, guiding the movement of the above mentioned shaft and of a fixed length shorter than the length of the above mentioned shaft, for fixing in a fixed position the above mentioned second cabinet with respect to the above mentioned first cabinet; and a securing means for removably securing the rear end part of this guide means to the rear end of the above mentioned second cabinet.

According to the second invention, by using the plurality of shafts and moving the second cabinet together with the movement of the shaft, the second cabinet can be moved and contained inside the first cabinet. The greater part of the second cabinet is contained in the space of the first cabinet so as to be of a shape and volume convenient to convey and the number of conveyances can be reduced. The conveying operation, installing operation, adjusting operation and servicing operation can be easily made. In order that the second cabinet may be pulled out of the first cabinet and fixed in a fixed position, such guide means as a pipe is used in addition to the above mentioned plurality of shafts and the rear end of this guide means is removably secured to the rear end part of the second cabinet by a securing means. Further, lest the above mentioned second cabinet should be removed out of the fixed position to move rearward, the second cabinet can be kept in the fixed position by fixing the rear end of the shaft led out rearward by the above mentioned guide means to the above mentioned second cabinet by such fixing means as a nut.

In the servicing operation or the like, when the fixing of the shaft rear end and the second cabinet is released and the second cabinet is only pulled out rearward, the shaft regulated in the movement by the first cabinet will be smoothly guided along the guide means as secured to the second cabinet and the second cabinet will be able to be smoothly pulled out of the first cabinet.

The third invention is a multiscreen display formed by arranging in the vertical and horizontal directions a predetermined number of unit displays made by fixing screens consisting of lenticular lenses and Fresnel lenses to screen fixing frames, wherein a plurality of wires are stretched on the front surface side of the above mentioned screen in the above mentioned unit display, the above mentioned screen is pressed against the above mentioned screen fitting frame and further pads pressing the peripheral edge of the above mentioned screen are arranged on the above mentioned screen fitting frame.

According to the third invention, as the plurality of wires are stretched on the front surface side of the screen and the screen is fixed to the screen fixing frame, the screen can be inhibited from floating and deflecting and can be positively fixed and further, as the peripheral edge of the screen is pressed by the pads, the screen can be fixed more positively.

The multiscreen display according to the fourth invention is characterized by comprising a plurality of Fresnel lenses, a plurality of Fresnel lens fitting frames formed like frames, having the above mentioned plurality of Fresnel lenses respectively fitted on the front surface side, having image lights from a plurality of projecting units respectively projected from the back surface side and connected and assembled with each other by a connecting means provided on the side surface, a lenticular lens and a lenticular lens fitting frame formed like a frame, having the above mentioned lenticular lens fitted on the front surface side and having the above mentioned assembled plurality of Fresnel lens fitting frames inserted from the back surface side.

According to the fourth invention, even when the slip of the image lights from the projecting units is large, the interference with the image lights will be able to be prevented by the plurality of Fresnel lens fitting frames and, as the plurality of Fresnel lens fitting frames are connected and assembled with each other by the connecting means provided on the side surface, in case the picture is made large, the handlability will be able to be improved.

BRIEF DESCRIPTION OF THE DRAWINGS

FIGS. 4(i a)–4(b) show a unit display in the second embodiment of a multiscreen display of the present invention and is a plan view and side view showing a formation example in the case that the rear half can be contained in the front half and a light box of a separate body can be put into and out of the movable side.

FIGS. 6(a)–6(b) show a unit display in the third embodiment of a multiscreen display of the present invention and is a plan view and side view of a formation example in which the rear half can be slidably contained in the front half.

DETAILED DESCRIPTION OF THE PREFERRED EMBODIMENTS

The embodiments shall be explained with reference to the drawings.

Figure 1:
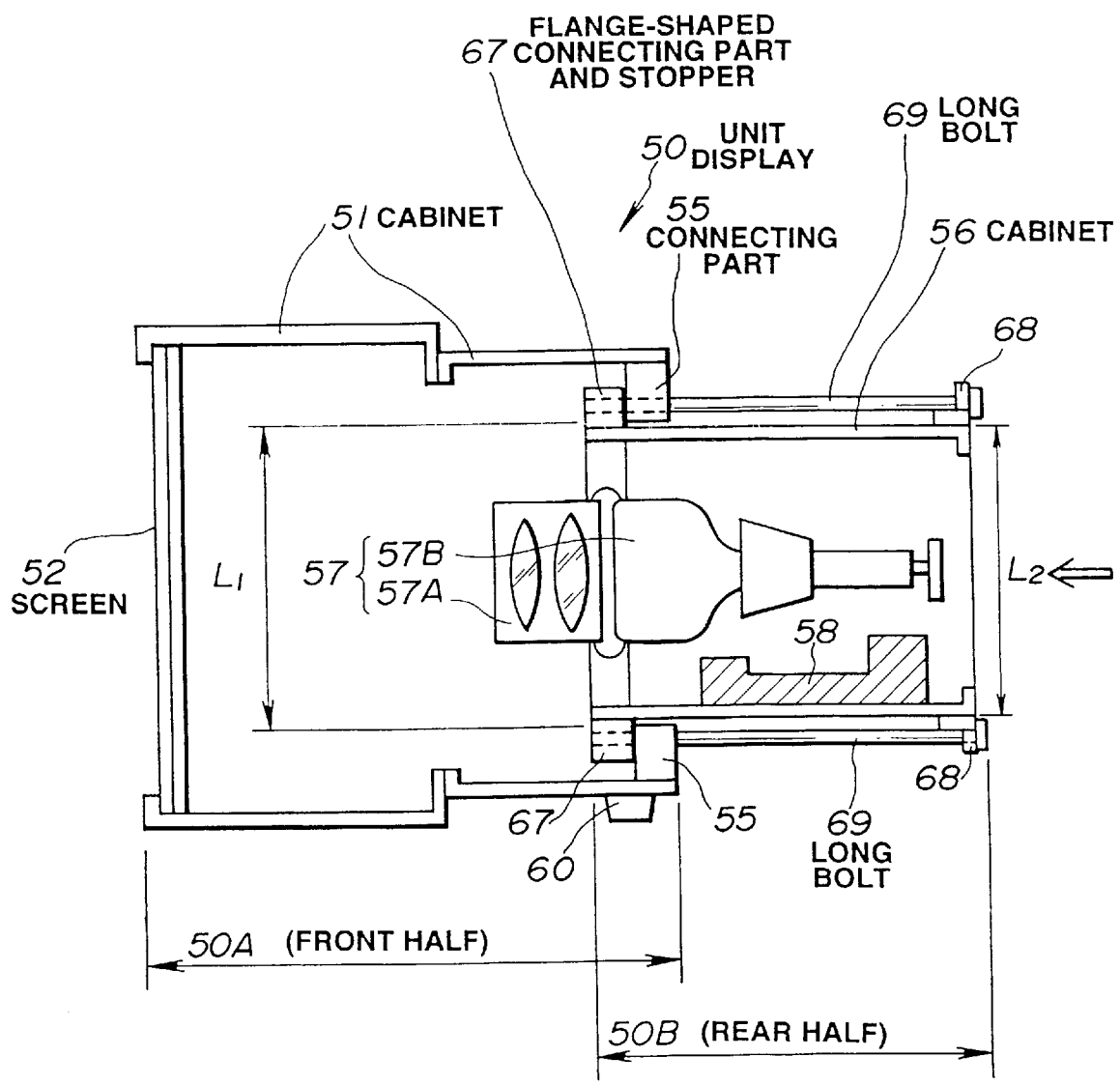
FIG. 1 shows a unit display in the first embodiment of a multiscreen display of the present invention and is a vertically sectioned view as the rear half is connected to the front half.

FIG. 1 shows a unit display in the first embodiment of a multiscreen display of the present invention and is a vertically sectioned view as the rear half is connected to the front half.

Figure 2:
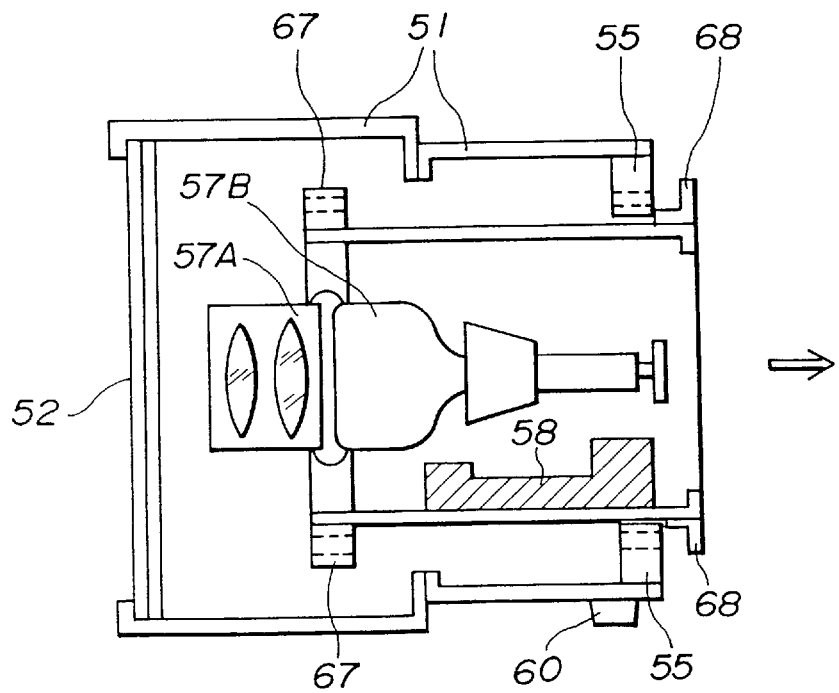
FIG. 2 shows the unit display in FIG. 1 and is a vertically sectioned view showing the rear half as contained inside the front half.

FIG. 2 is a vertically sectioned view showing as the rear half is contained inside the front half.

In FIG. 1, a unit display 50 is shown being divided into the front half 50A and rear half 50B. In the front half 50A, only a screen 52 is combined in a cabinet 51. A connecting part 55 s provided on the inner periphery of the rear end part of the cabinet 51 for connecting the front half 50A with the rear half 50B. On the other hand, in the rear half 50B, image projecting parts as optical system parts such 57 and chassis parts 58 are combined in a cabinet 56 in the rear half. A flange-shaped connecting part and stopper 67 is provided on the outer periphery of the front end part of the cabinet 56 for connecting the rear half 50B with the front half 50A. A left part 60 is arranged on the lower surface of the front half 50A.

Figure 3:
FIG. 3 is a view showing an example of the long bolt in FIG. 1.

Here, the rear inner dimension $L_1$ of the front half 50A is set to be larger than the outer dimension $L_2$ of the rear (greater part) of the rear half 50B. When moving the display in a conveying operation the rear half 50B will be able to be contained within the front half 50A as shown in FIG. 2. Therefore, the above mentioned flange-shaped connecting part and stopper 67 enters the inside of the front half 50A and the rear half 50B is made movable forward and rearward. From the contained state in FIG. 2, when the rear end part of the rear half 50B is pulled out of the front half 50A, the flange-shaped connecting part and stopper 67 of the rear half 50B comes into contact with the connecting part 55 of the front half 50A. In this contact state, the connecting part 55 and the flange-shaped connecting part and stopper 67 are connected and fixed together using, for example a long bolt 69, to achieve FIG. 1. Flange parts 68 are arranged on the upper and lower surfaces of the rear end part of the rear half 50B. A long bolt 69, such as is shown in FIG. 3 is inserted through the above mentioned connecting parts 55 and 67 from this flange part 68, thereby fixing the front and rear halves.

The connecting bolt 69 is removed from the front half 50A and rear half 50B that are integrally connected through the connecting bolt 69, and the rear half 50B is moved as shown by the arrow in FIG. 1 and is contained within the front half 50A so that the state in FIG. 2 may be made from the state in FIG. 1.

Figure 5:
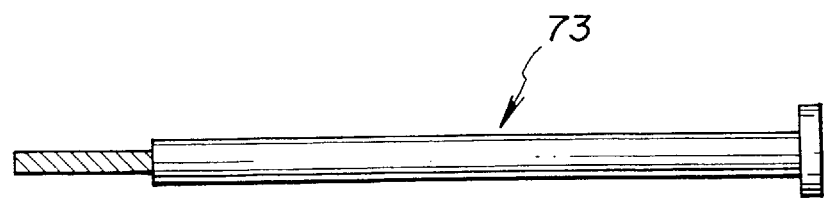
FIG. 5 is a view showing an example of the long bolt in FIG. 4.

FIGS. 4(a) and 4(b) show a unit display in the second embodiment of a unit display of the present invention. FIG. 4(a) represents a plan view and FIG. 4(b) represents a side view. A separate light box 70 is formed in the rear half 50B which is a movable side so as to be able to be freely put into and out of the front half (screen part) 50A which is a fixed side. So that the above mentioned rear half 50B may be fixed in a fixed position with respect to the above mentioned front half 50A, flange parts 71 are provided in the front end part of the cabinet 56 of the above mentioned rear half 50B so as to project outside as shown in FIG. 4(a). Nuts 74 are embedded in the flange parts 71, flange parts 80 are provided on the inner surface of the rear end part of the above mentioned front half 50A so as to project inside as shown in FIG. 4(b). Through holes of the same diameter as the inside diameter of the nut are provided in the positions corresponding to the positions of the nuts 74 of the flange parts 80. Additionally a flange part 72 is provided on the outer periphery of the rear end part of the above mentioned rear half 50B so as to project outside and a through hole (of a diameter larger than the above mentioned nut diameter) through which the large diameter part of the long bolt 73 will pass is provided in the flange part 72. The above mentioned long bolt 73 is screw-threaded at the tip as shown in FIG. 5. It is of a large diameter in the part other than the screw thread part and is of a stepped shape.

To allow the above mentioned rear half 50B to be fixed in a predetermined position with respect to the above mentioned front half 50A, the above mentioned flange parts 71 will come into contact with the above mentioned flange parts 80 when the above mentioned rear half 50B is pulled out to the maximum, and the above mentioned rear half 50B will be regulated not to move rearward from the predetermined position. When the above mentioned long bolts 73 are passed through the through holes of the flange part 72 in the rear of the above mentioned rear half 50B from the back surface side, are further passed through the through holes of the rear flange parts 80 of the above mentioned front half 50A, and are at last screwed with the nuts 74 of the front flange parts 71, the step parts of the above mentioned bolts 73 stop on the rear end surface of the above mentioned front half 50A. Additionally, in this case, the flange parts 80 at the rear end of the above mentioned front half 50A are fastened with the screw parts at the tips of the above mentioned bolts 73, the above mentioned nuts 74 are screwed to the screw parts, and the above mentioned front half 50A and rear half 50B are positively connected and fixed. By the way, at the time of a maintenance service, when the light box 70 is taken out of the cabinet 56, parts will be able to be replaced. The reference numerals 60 and 61 represent leg parts.

In the embodiment of FIGS. 4(A) and 4(b), the light box 70 is separate. However, this embodiment can be applied also to the case of a structure in which the cabinet 56 is simultaneously the light.

FIGS. 6(a) and 6(b) show a unit display in the third embodiment of a multiscreen display of the present invention, and shows a formation example of a unit display in which the rear half can be contained in the front half so that the loaded volume to be conveyed may be reduced. FIG. 6(a) represents a plan view and FIG. 6(b) represent a side view. The same elements as in FIG. 1 shall be explained with the same reference numerals attached.

In FIGS. 6(a)–6(b), the rear half 50B containing light box parts comprising optical system parts 57 and chassis parts 58 within the cabinet 56 is formed so as to be slidably contained into or pulled out of the inside of the front half 50A containing the screen 52 within the cabinet 51 by using a plurality (4 in the drawing) of shafts. The optical system parts 57 and chassis parts 58 are mounted within the cabinet 56 of the rear half 50B. FIGS. 6(a) and 6(b) show the rear half 50B as pulled out to a predetermined position in the rear. In this position, the optical system parts 57 are set in the projecting position optically optimum to the screen 52.

As shown in FIG. 6(b), a flange part 80 is provided to project inside on the inner surface of the rear end part of the front half 50A, and a flange part 81 is provided to project outside on the outer periphery of the rear end part of the rear half 50B. Four shafts 83 are arranged through the flange parts 80 and 81. A common stopper 82 is secured to one end part (front end part through the flange part 80) of each of the two upper and lower shafts 83. The other end parts of the shafts 83 are passed using the flange part 81 through pipes 86 as guide means, and are fixed to this flange part 81 by such fixing means 90 such nuts. The front end of the pipe 86 as is in contact with the rear end part of the cabinet 51 of the front half part 50A as guide and the rear end of the pipe 86 is secured to the rear end part of the flange part 81 of the cabinet 56 of the rear half part 50B by later described securing means. This securing means shall be explained in FIGS. 7 to 9. The details of the locking structure of the shaft 83, pipe 86 and flange parts 80 and 81 in the predetermined position shown in FIG. 6 shall be described with reference to FIG. 8.

Figure 7:
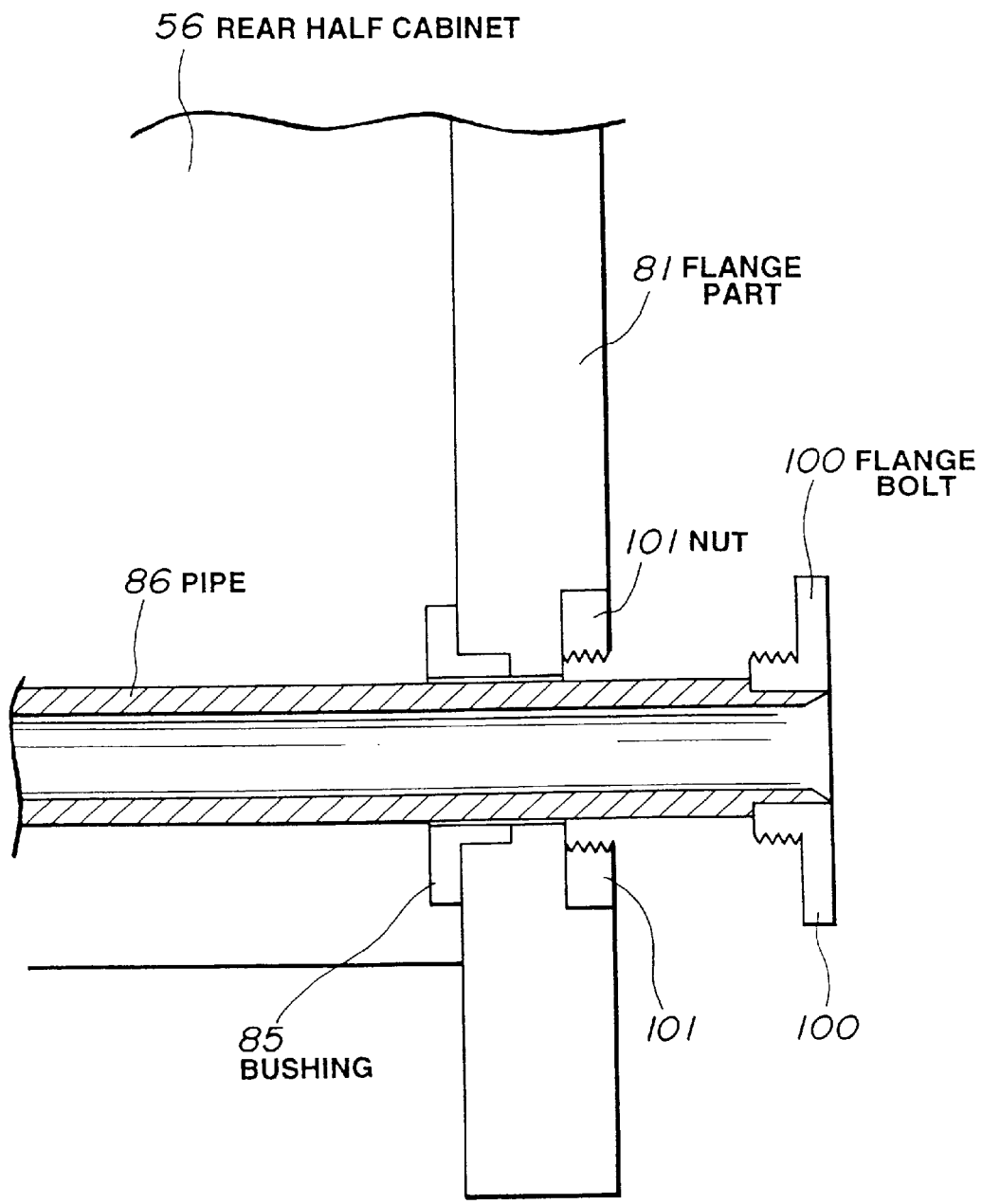
FIG. 7 is a vertically sectioned view showing a locking structure of a cabinet and pipe in the rear half part in FIG. 6.

FIG. 7 is a vertically sectioned view showing a means for securing the rear end of the above mentioned pipe 86 to the rear end part of the flange part 81 of the cabinet 56 of the rear half part 50B. In order to improve the workability in assembling, the above described pipe 86, fixing metal fixture 87 and fixing screw 88 are made integral.

In FIG. 7, first of all, a flanged bolt (male screw) 100 is fixed to the rear end of the pipe 86 by such means as calking. On the other hand, a nut (female screw) 101 screwing with the above mentioned bolt 100 is fitted to the flange part 81 of the cabinet 56 of the rear half part by such means as welding. Here, the inside diameter of the pipe 86 is made somewhat larger than the outside diameter of the later described shaft 83 and a bushing 85 fitted to the outside diameter of this pipe 86 is fitted to the flange part 81 of the cabinet 56.

Figure 8:
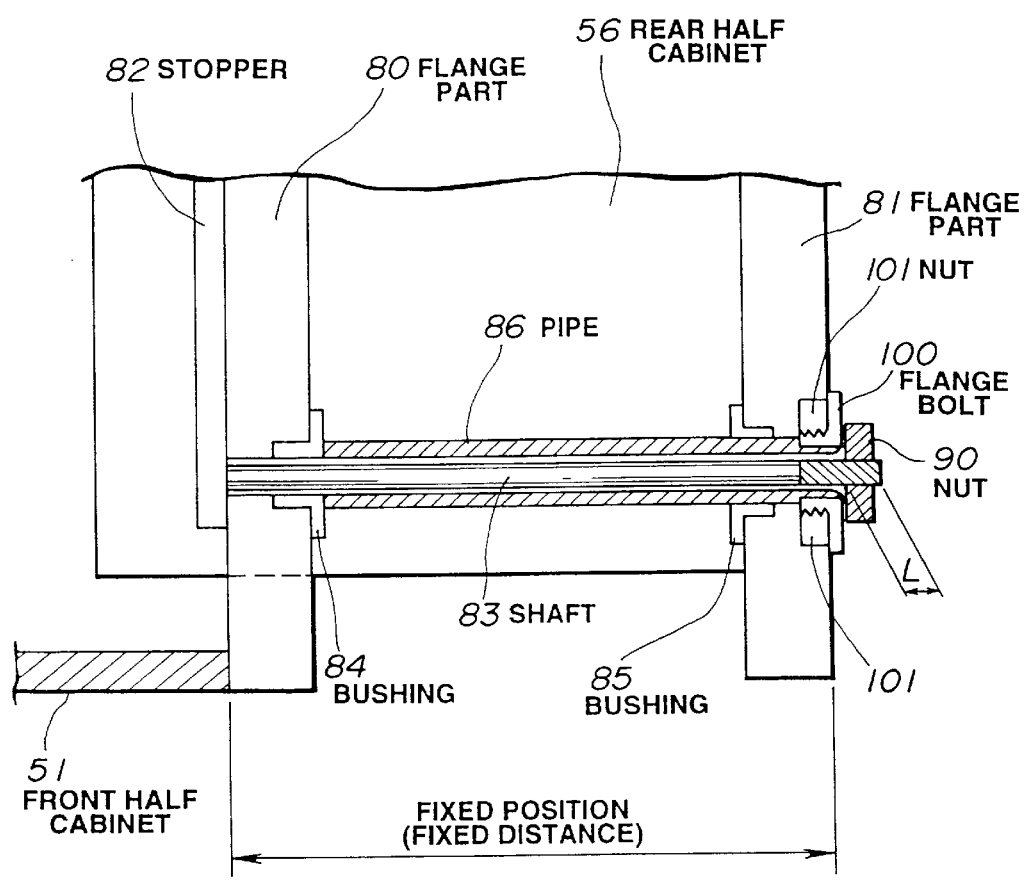
FIG. 8 is a vertically sectioned view showing a locking structure of a cabinet in the front half part and a cabinet, pipe and shaft in the rear half part in FIG. 6.

FIG. 8 is a sectioned view showing the details of a locking structure of the shaft 83 and flange parts 80 and 81 in FIG. 6(b).

As shown in FIG. 8, the shaft 83 and stopper 82 are connected and fixed by welding or the like. A bushing 84 fitted to the shaft diameter is fitted to the flange part 80 in the rear of the cabinet 51 of the front half 50A. When the shaft 83 is inserted into this bushing 84, the shaft 83 will become smoothly movable forward and rearward. When the cabinet 56 of the rear half 50B is in a predetermined position (fixed distance: an optically normal position) with respect to the cabinet 51 of the front half 50A, the shaft 83 will be able to be projected rearward until the stopper 82 that is fixed to the shaft 83 collides with the flange part 80 in the rear of the cabinet 51 of the front half.

Then, the cabinet 56 of the rear half is placed in a predetermined position with the cabinet 51 of the front half so that, when the shaft 83 is inserted into the pipe 86, the rear end of this shaft may project by a dimension L out of the pipe length and a screw thread somewhat longer than this dimension L is formed at the rear end of the shaft 83. After the shaft 83 is inserted into the pipe 86 from the rear of the flange part 81, the flanged bolt 100 secured to the shaft 83 is screwed to the nut 101 fixed to the flange part 81, thereby converting and fixing the pipe 86 to the flange part 81 in the rear of the cabinet 56. At last, the nut 90 is screwed to the shaft 83. When the fastening is completed, the flange part of the flanged bolt 100 will be fastened so as to be pressed by the nut 90. At the same time, the shaft 83 itself will be pulled out rearward and fixed by the fastening of the nut 90. (That is to say, the flange part 80 in the rear of the cabinet 51 of the front half will be held and fixed by the stopper 82 and the front end of the pipe 86.) Therefore, as a result, the flange part 80 in the rear of the cabinet 51 of the front half and the flange part 81 in the rear of the cabinet 56 of the rear half will be always able to keep a predetermined position corresponding to the pipe length.

In the above structure, the operation procedures of "inserting the pipe 86→fastening the flanged bolt 100→fastening the nut 90" are only carried out all from the back surface side of the cabinet. Therefore even after the cabinets are heaped in steps, after the cabinet 56 in the rear half is pulled rearward out of the contained state (the state in FIG. 11), the cabinet will be able to be set in the normal position all by the operations from the back surface side.

As the flanged bolt 100 is secured to the rear end of the pipe 86, there are advantages that the assembling operation will be simple and the number of the component parts will be few.

Figure 9:
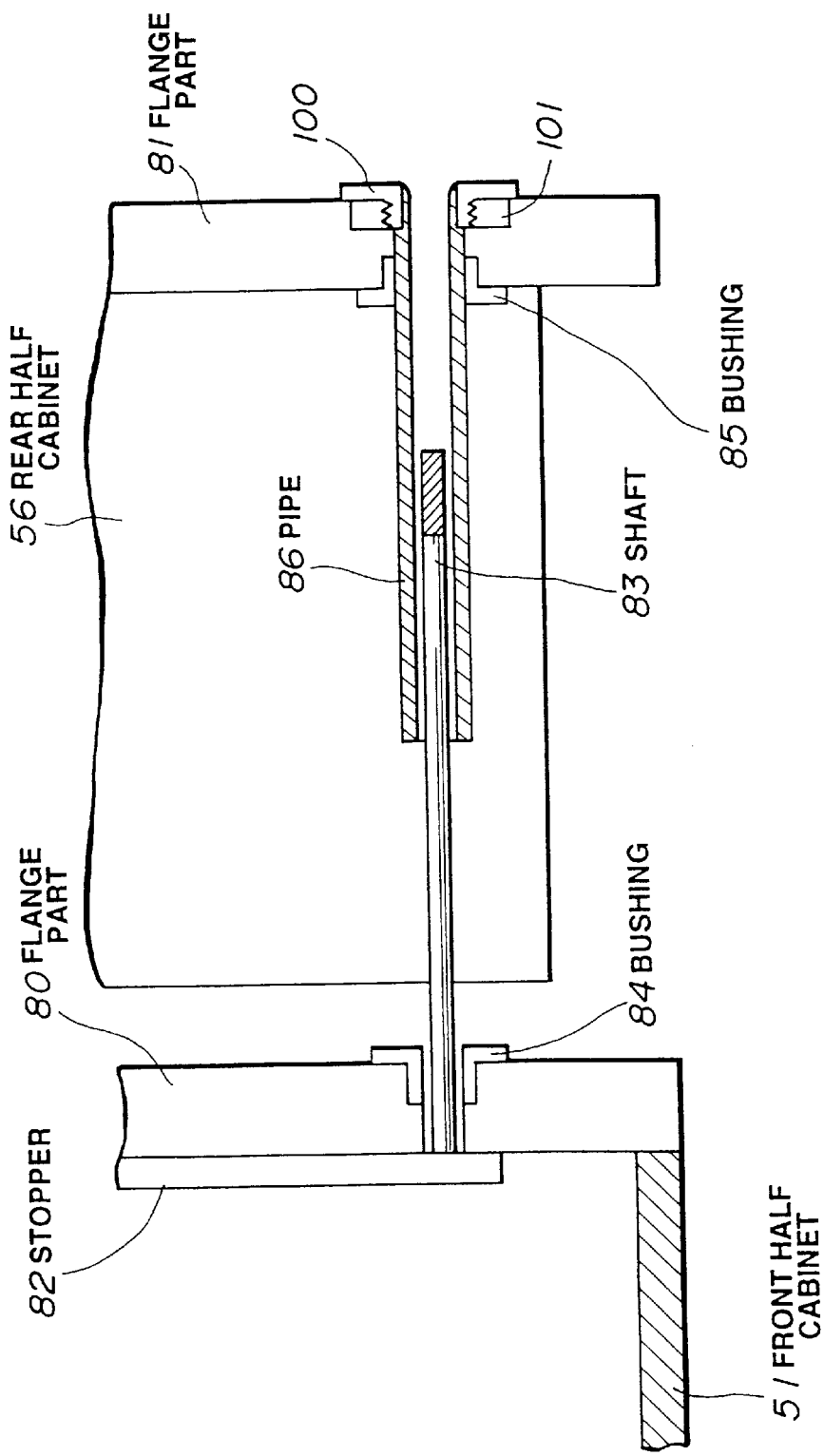
FIG. 9 is a vertically sectioned view as the nut is removed from the state in FIG. 8 and the cabinet in the rear half part is pulled out rearward.
Figure 10:
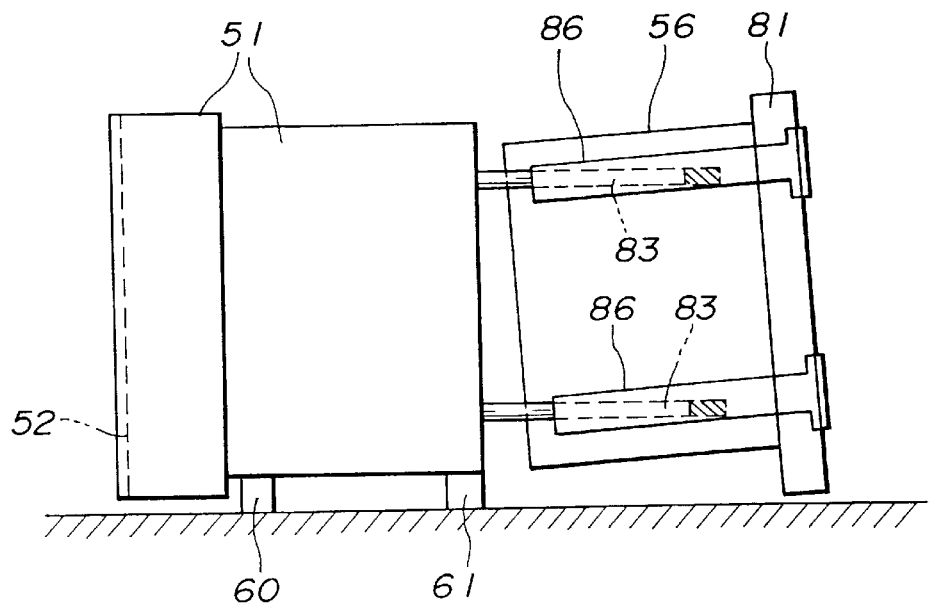
FIG. 10 is a side view of a unit display showing the state in FIG. 9.

Further, as an additional effect, as the pipe 86 and the cabinet 56 in the rear half part are made integral by the screwed connection of the bolt 100 and nut 101. Even if the nut 90 is removed from the rear end of the shaft 3 and the cabinet 56 is pulled out rearward (i.e., when the cabinet 56 of the rear half part is pulled out in a maintenance service), as shown in FIG. 9, the pipe 86 will remain connected and fixed to the flange part 81 of the cabinet 56. Even if the cabinet 56 is pulled out further rearward, the shaft 83 will remain locked within the pipe 86, and, by the rigidity of the pipe 86, as shown in FIG. 10, the front end of the cabinet 56 pulled out will only incline but will not touch the floor and the cabinet 56 will be able to be smoothly pulled out with the pipe 86 as a guide.

When conveyed or the like, the cabinet 56 will be able to be moved and contained within the cabinet 51.

Figure 11:
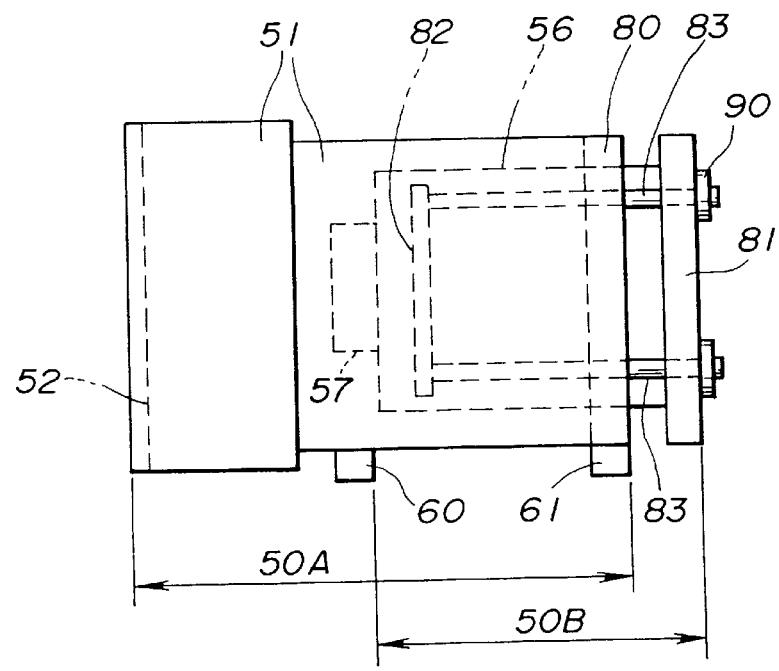
FIG. 11 is a side view showing a unit display in FIG. 6 as a cabinet in the rear half is slid and contained inside a cabinet in the front half.
Figure 12:
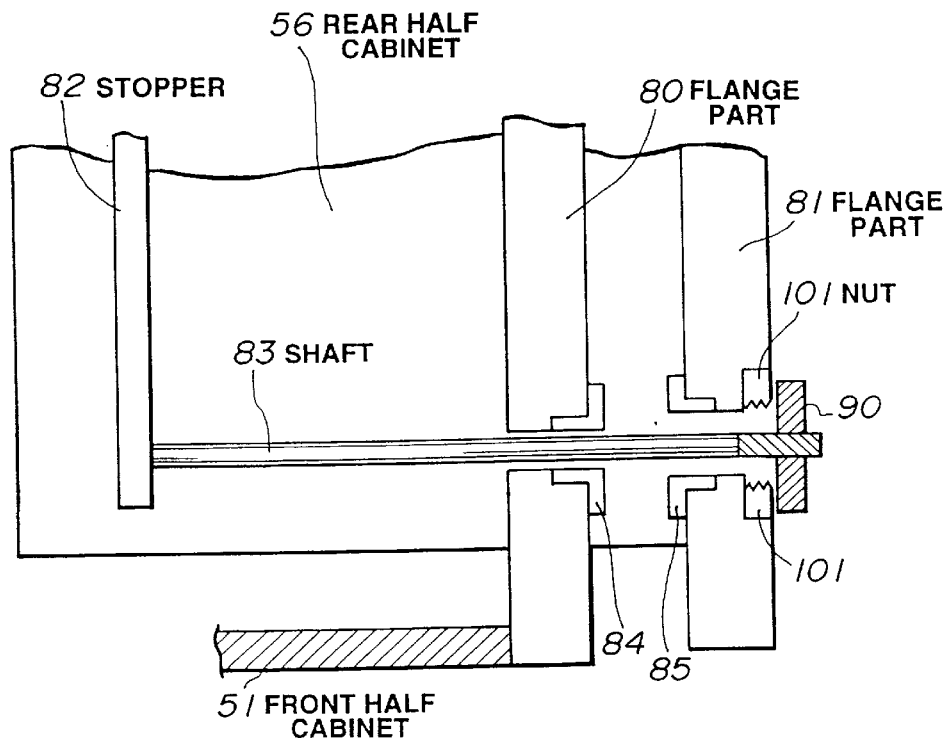
FIG. 12 is a vertically sectioned view showing an essential part in the state in FIG. 11.

FIG. 11 is a side view showing the rear half 50B as slid and contained inside the front half 50A. FIG. 12 is a vertically sectioned view showing an essential part in the state in FIG. 11.

In order to move and contain the cabinet, as in FIG. 6(*b*), the nut 90 is removed from the fixed state in the predetermined position, the connection of the flanged bolt 100 at the rear end of the pipe 86 and the nut 101 fixed to the flanged part 81 is disconnected, the pipe 86 is pulled out, then the nut 90 is fitted again to the rear end of the shaft 83, and the cabinet 56 may be moved to be pushed into the cabinet 51.

When the cabinet is delivered after the production, when it is conveyed in a contained state as shown in FIG. 11 to an installing place, it is arranged in a predetermined place and then the cabinet 56 of the rear half part is pulled out of the cabinet 51 of the front half part and, when the stopper 82 comes into contact with the front end of the flange part 80 as regulated, the nut 90 is removed from the rear end of the shaft 83, the pipe 86 is inserted from the rear of the flange part 86 so as to be inserted through the pipe, the flanged bolt 100 at the rear end of the pipe 86 is connected and secured to the nut 101 fixed to the flange part 81, and then the nut 90 will be again screwed to the rear end of the shaft 83 so that the cabinet 56 of the rear half part may be fixed in the predetermined position as shown in FIG. 6(*b*).

Figure 14:
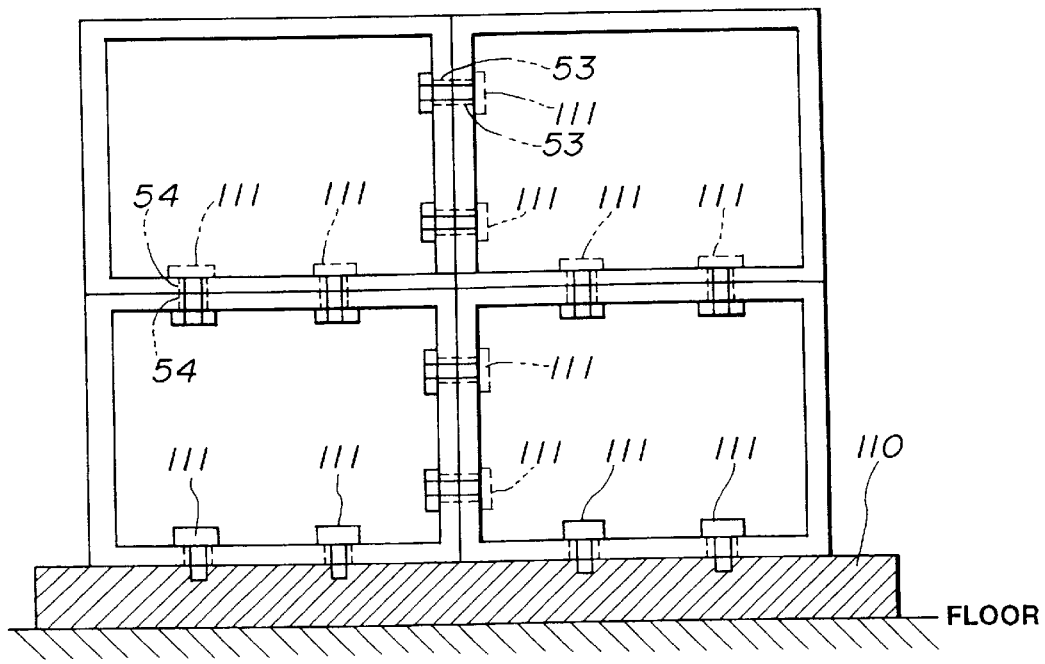
FIG. 14 is a front view of FIG. 13.
Figure 13:
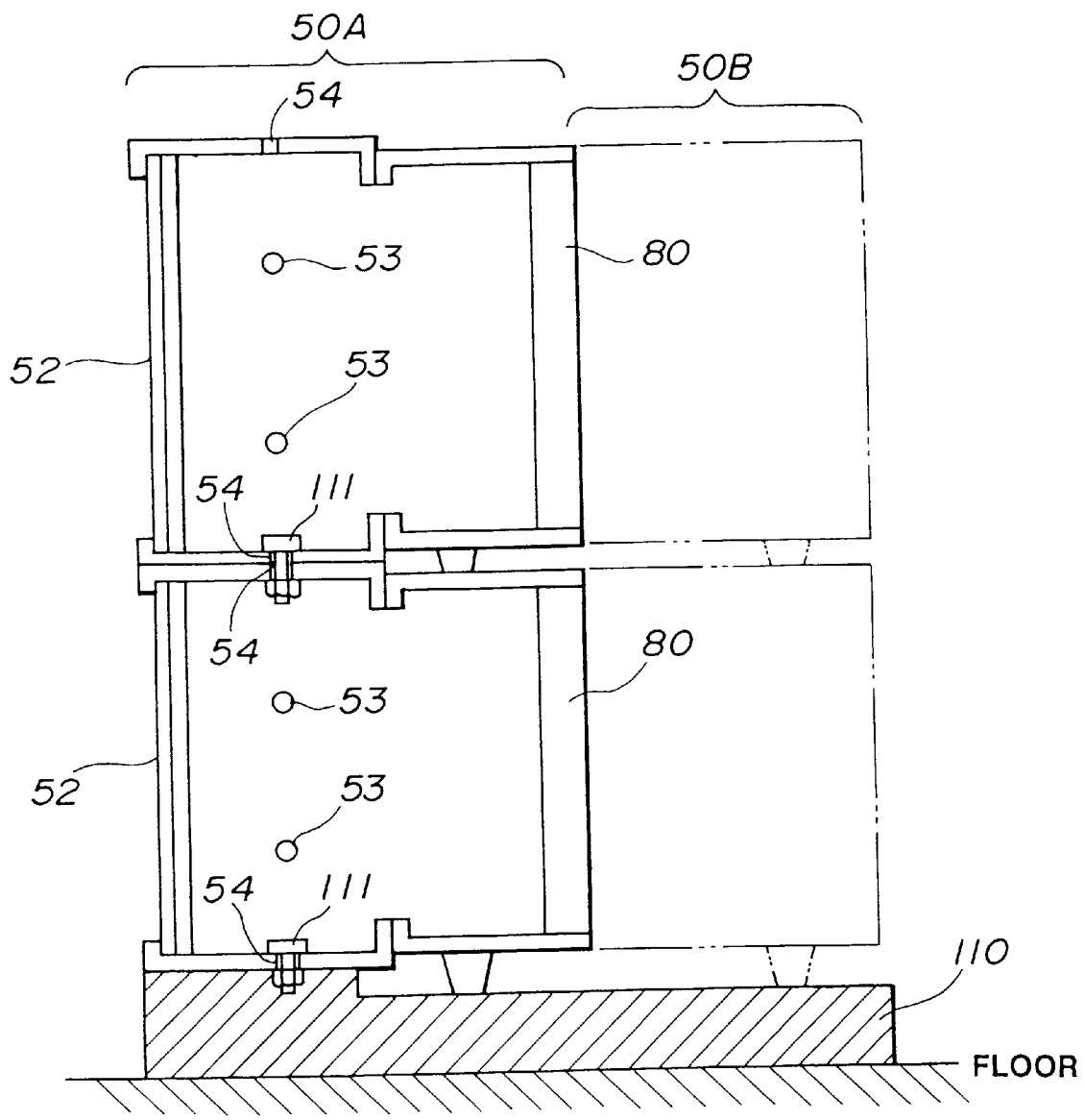
FIG. 13 is a vertically sectioned view showing the connection when the front half in FIG. 6 is divided and is stacked up in two steps to form a four-surface multiscreen display.

FIG. 13 is a vertically sectioned view showing a connected state when a four-face multiscreen display is formed by stacking in two steps the front halves of the unit displays shown in the embodiment in FIGS. 6(*a*) and 6(*b*). FIG. 14 is an elevation of the same.

As shown in these drawings, the front half 50A of the unit display 50 on the lower step is connected and fixed to a base 110 on the floor by such locking means as bolts 111 through through holes 54 on the bottom surface. Then, the front half 50A of the unit display 50 on the upper step is mounted and the unit displays 50 are connected and fixed by passing the bolts 111 through the through holes 54 on the bottom surface of the front half 50A on the upper step and the through holes 54 on the upper half 50A on the lower step.

Figure 57:
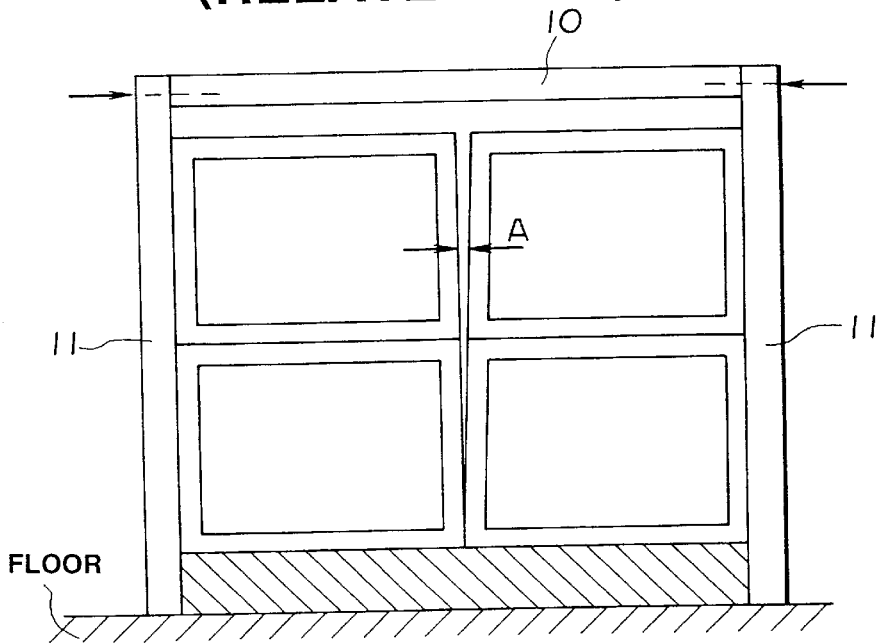
FIG. 57 is a view explaining the problem when unit displays are stacked up in steps.
Figure 58:
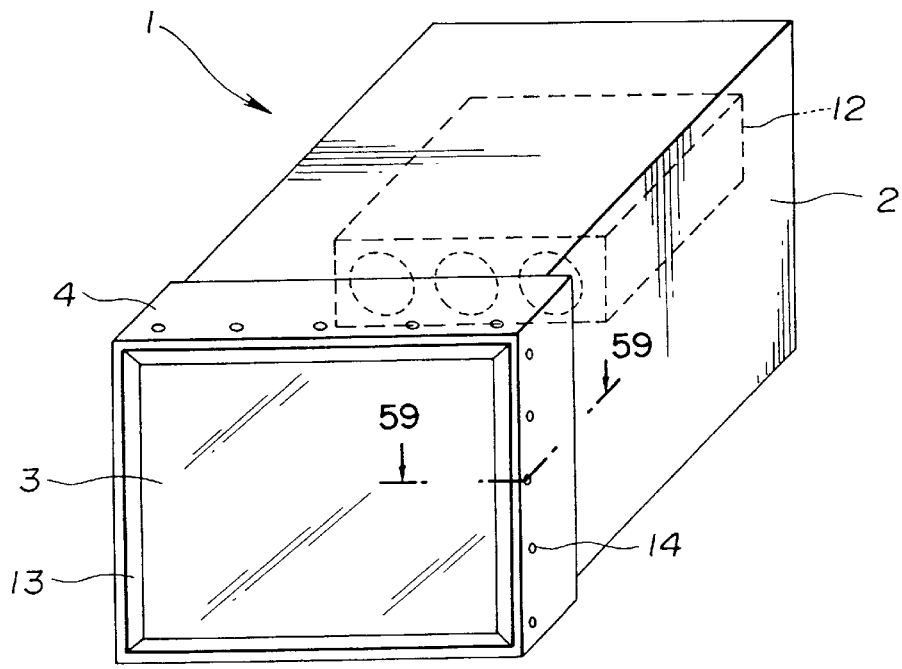
FIG. 58 is a perspective view showing another formation of a conventional unit display.
Figure 59:
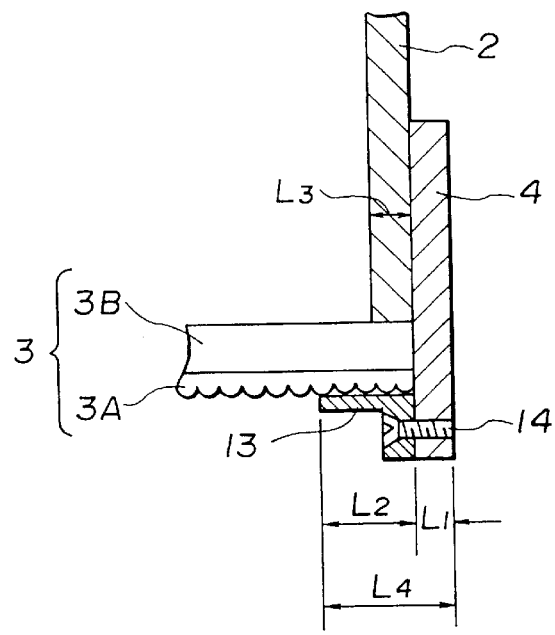
FIG. 59 is a partly sectioned view on line 59—59 in FIG. 58.

Further, as shown in FIG. 14, the front halves 50A of the unit displays 50 in the horizontal direction of the four-face multiscreen display are connected and fixed by passing the bolts 111 through the through holes 53 on the respective sides of the front halves 50A of the respective unit displays 50. Thus, all the four stacked unit displays and the base 110 are firmly connected and fixed into a four-face multiscreen display as if integrally, the gap A which has been a problem in the conventional example (FIG. 57) between the unit displays 50 can be eliminated, and the angle or the like for rectifying the outer periphery becomes unnecessary.

As in the above, after the screen part for the multipicture is formed by stacking up only the front halves 50A of the unit displays 50, the rear halves 50B are connected and fixed to the front halves 50A of the respective unit displays 50 by means of the above described shafts or the like to complete the inherent unit displays 50.

According to the above described embodiments in FIGS. 1 to 14, when the unit display which is a component of a multiscreen display is divided into two parts of a first part containing screen parts and a second part containing optical system parts and chassis part, the weight and volume of each part will become half and the conveying operation, installing operation and the adjusting operation and servicing operation after the installation will become safe and easy. Particularly, according to the embodiments in FIGS. 6(*a*) to 14, in making a multiscreen (stacking in steps), first, the first part containing the screen parts is assembled, the respective first parts can be easily connected in the vertical direction and horizontal direction and the joints can be almost eliminated.

Also, according to the embodiments in FIGS. 1 to 12, when the second part is contained in the first part, in the conveyance and storage, the loading efficiency can be improved and the space can be reduced. Particularly, according to the embodiments in FIGS. 6(*a*) to 12, in installing, as the second cabinet is set in a predetermined position with respect to the first cabinet, such guide means as pipes can be easily fitted. Therefore, in the case of assembling the cabinets in a predetermined position and separating the second cabinet from the first cabinet, the operations will be easy and the number of parts will be reduced.

Figure 15:
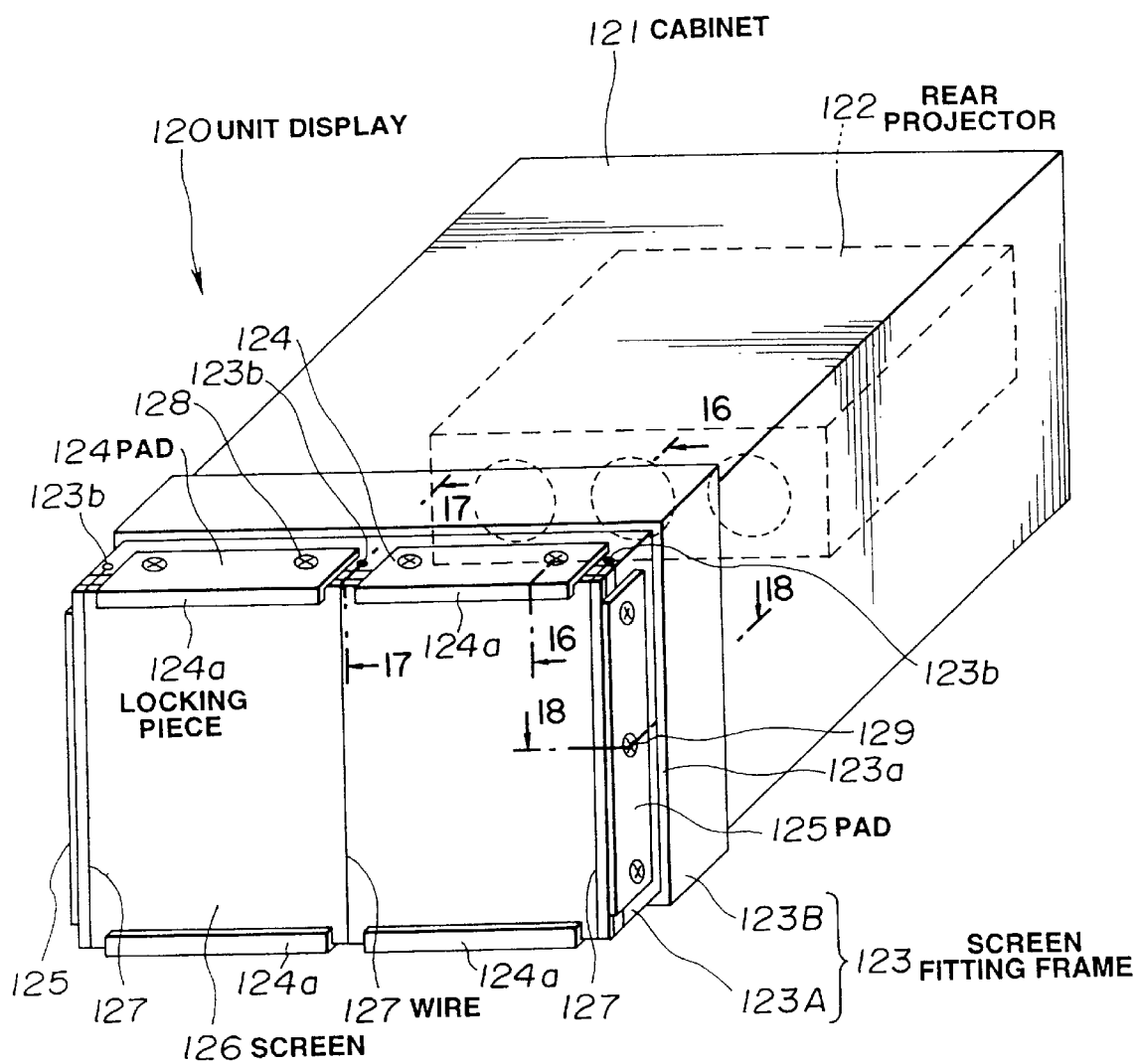
FIG. 15 is a perspective view showing a unit display in the fourth embodiment of a multiscreen display of the present invention.
Figure 16:
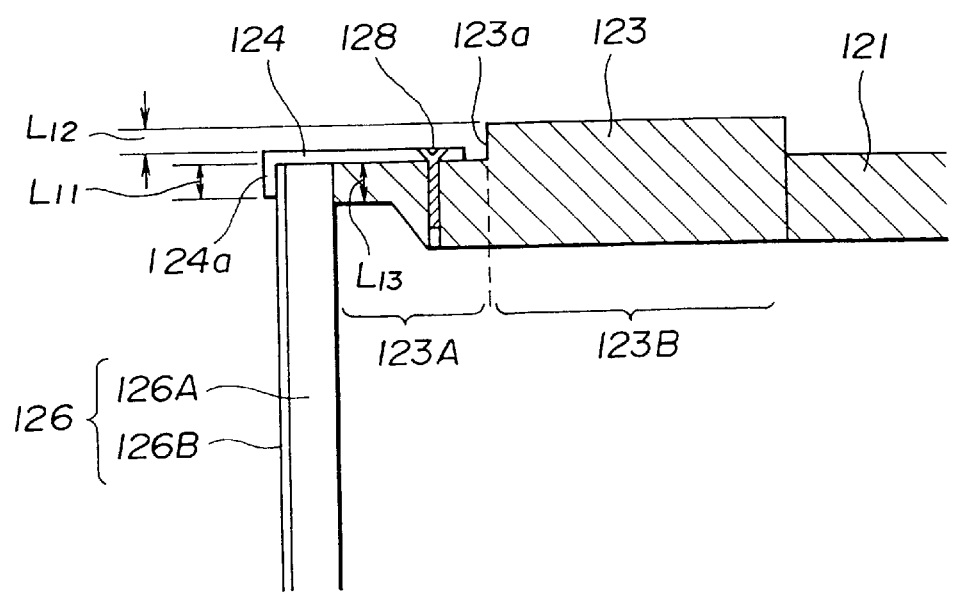
FIG. 16 is a sectioned view on line 16—16 in FIG. 15.
Figure 17:
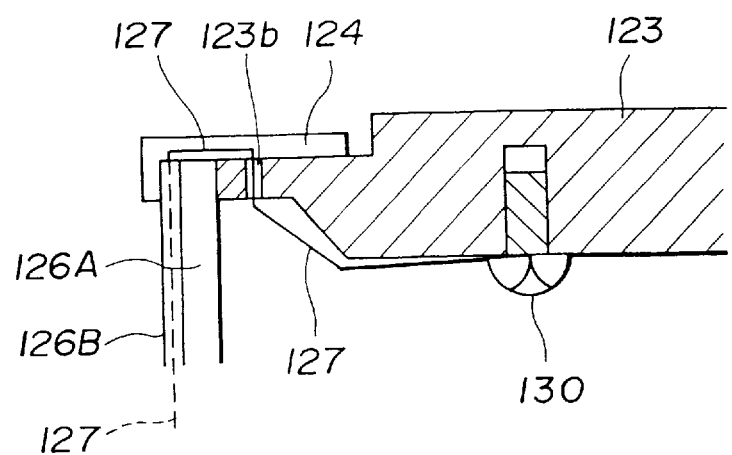
FIG. 17 is a sectioned view on line 17—17 in FIG. 15.
Figure 18:
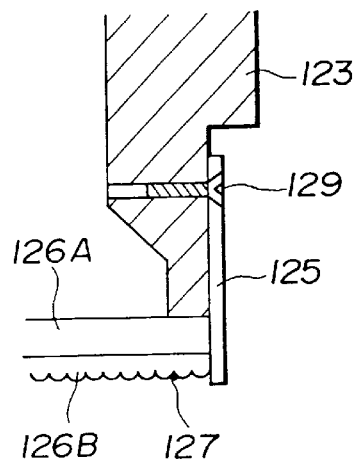
FIG. 18 is a sectioned view on line 18—18 in FIG. 15.

FIG. 15 is a perspective view showing a unit display in the fourth embodiment of a multiscreen display of the present invention. FIG. 16 is a sectioned view on line 16—16 in FIG. 15. FIG. 17 is a sectioned view on line 17—17 in FIG. 15. FIG. 18 is a sectioned view on line 18—18 in FIG. 15.

In FIG. 15, in a unit spray 120, a rear projector 122 is arranged within a cabinet 121, a screen fitting frame 123 is integrally provided on the front side of the cabinet 121, a screen 126 is fitted to this screen fitting frame 123, a plurality (three in the drawing) of wires 127 are stretched in the vertical direction on the surface of the screen 126, the screen 126 is pressed against the screen fitting frame 123, and the peripheral edge of the screen 126 is pressed with pads 124 and 125.

As shown in FIG. 16, the screen 126 is a Fresnel lens 126A on the back surface and a lenticular lens 126B on the front surface. Lights are once collected by the Fresnel lens 126 and are divided on the light and left by the lenticular lens 126B. The screen fitting frame 123 is formed of a screen side part 123A having a thin part and a thick rear side part 123B. It is secured so as to be integral with the part of the cabinet 121.

In fitting the screen 126, as shown in FIG. 17, a plurality (in the drawing, respectively three on the upper surface and lower surface of the screen fitting frame 123) of through holes 123*b* are provided near the screen in the screen fitting frame 123, the end part of a wire 127 is passed through the upper and lower holes 123*b*, the wire 127 is pulled with a fixing screw 130 in the thick part on the rear side of the screen fitting frame 123. The screen 126 is pressed in between the wire and the front end part (receiving part) of the screen fitting frame 123.

The wire 127 is thinner than the vertical groove width of the lenticular lens 126B and is stretched in the vertical groove of the lenticular lens 126B as shown in FIG. 18. Therefore the screen 126 will be prevented from lagging in the horizontal direction.

The peripheral edge of the screen 126 is pressed in with pads 124 and 125. Two sets of the pads 124 are arranged so as to be positioned among three wires 127. The pad 124 is provided with a locking piece 124 for locking the upper and lower ends of the front surface of the screen 126 and is screwed and fixed to the screen fixing frame 123 with screws 128 as shown in FIG. 16. The pad 125 is screwed and fixed to the screen fitting frame 123 with screws 129 as shown in FIG. 18 so as to press the right and left ends of the periphery of the screen 126. The pad 125 has no locking piece and a set of them is arranged on the right and left of the screen fitting frame.

Though the right and left pads 125 have no locking piece, as shown in FIG. 18, the wires 127 are arranged on the front surface of the screen fitting frame 123 and the screen 126 is pressed by the screen fitting frame 123 and wires 127 in a sandwich form. Therefore, a force sufficient to suppress the screen 126 deflecting direction will be developed and there will be no problem. As the locking part is thus unnecessary for the pad 125, the joint of the multiscreen formed by arranging unit displays will be extremely small and the thickness of the pad 125 only will do.

Figure 19:
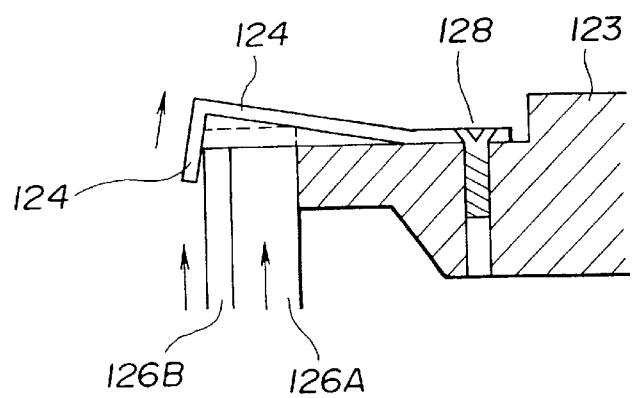
FIG. 19 is a sectioned view showing the effect of a pad in the embodiment in FIG. 15.

When the pad 124 is of a selected material and thickness having a spring effect and is fixed to the screen fitting frame 123 with the screws 128, a spring effect will be produced in the tip part supporting the screen end. Therefore, as shown in FIG. 19, even if the screen 126 thermally expands (as shown by the dotted line), only the pad 124 will be transformed, no stress will be generated within the screen and the screen 126 will be able to be maintained. That is to say, even if a strain is generated by heat in the screen 126 and the screen 126 is transformed to be diamond-shaped, a stress escaping from the screen fitting frame 123 will act strongly. This is the same also on the pad 125.

Particularly, during the conveyance by a truck or the like, even if the interior becomes high in the temperature, no stress will be given to the screen 126. Even against the expansion and lag of the screen 125, pressing space L11 of the locking part 124a as is shown in FIG. 16 will be always maintained. Therefore, even if an impact load is applied from outside during the conveyance, the screen end will be able to be positively held.

The above mentioned wire 127 has effects of preventing the upper and lower ends of the screen 126 from floating and preventing the central part of the screen 126 from being transformed. For example, during the conveyance or handling, even if a diamond-shaped transformation is instantaneously produced in the diagonal direction of the screen 126, the screen end will not easily protrude out of the pressing space L11 of the locking piece 124a of the pad 124 because the swelling and depression of the screen 126 are prevented by the wires 127.

Furthermore, because the screen 126 is pressed in against the receiving part of the screen fitting frame 123 by the plurality of wires 127 and the pads 124 and 125, the dimension L13 of the receiving part of the screen fitting frame 123 shown in FIG. 2 can be designed to be smaller than before.

Figure 20:
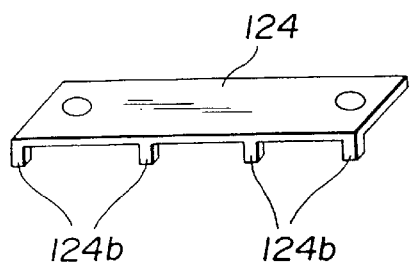
FIG. 20 is a perspective view showing another embodiment of a pad.

Note also that the pad 124 may have locking pawls 124b as are shown in FIG. 20 in lieu of locking pieces 124a of FIG. 15.

Figure 21:
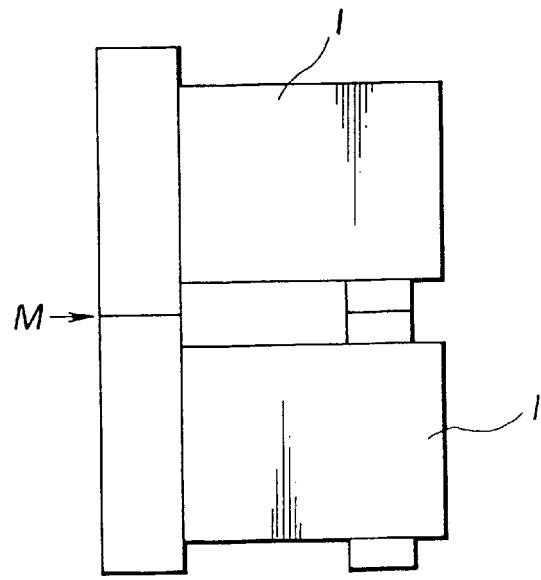
FIG. 21 is a side view showing a multiscreen display assembled so as to make the joint zero.

On the other hand, in the conventional example, in case the unit displays 1 are stacked up in multisteps as shown in FIG. 21, the joint will be so wide that the gap M between the stacked unit displays is very small or non-existent. Due to the small gap between unit displays, the great thermal expansion will be primarily experienced in the screen part, causing the screen to be by the increase of the dimension. Consequently, the quality of the picture will reduce. That is to say, there will be no escape from the thermal expansion of the screen.

To prevent such problems, the present invention provides a step difference 123a (of a dimension L12) in the fixing part of the pad 124 and the thick part of the screen fitting frame as shown in FIG. 16. Therefore, even if the screen dimension is expanded and the pad 124 is transformed by the thermal expansion as described above, as there is an escape, the screen surface will be able to be held without generating a warp.

Figure 22:
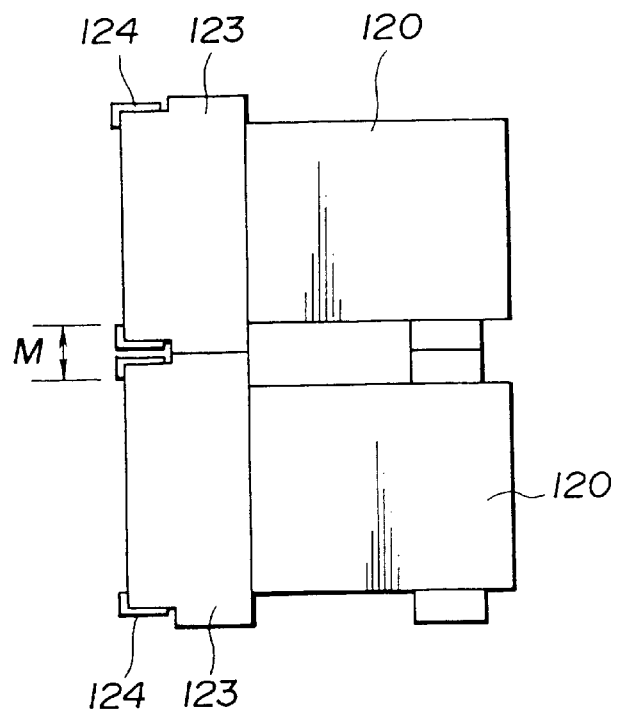
FIG. 22 is a side view showing a multiscreen display assembled by using the unit displays in FIG. 15.

Because the joint in this embodiment is designed by such small dimensions as the dimension L11 of the locking piece 124a of the pad 124 in the vertical direction and only the thickness of the pad 125 in the horizontal direction as shown in FIG. 22, the joint M will be able to be made far smaller, when the unit displays are stacked in multisteps as compared with the conventional example, even if the step difference L12 is included in the joint between the unit displays.

According to the above described embodiment in FIG. 15, the joint between the unit displays can be controlled to be extremely minimum, the screen can be always positively held against the dimension variation by the thermal expansion coefficient difference between the screen itself and the frame, and no strain is given to the screen itself.

Another embodiment relating to the embodiment in FIG. 15 pertains to, conveying the unit display 120. The screen 126 is pressed against the screen fitting frame 123 with a plurality of wires 127 and the peripheral edge of the screen is pressed with the pad 124 having the locking pieces 124a or locking pawls 124b (See FIG. 20) and, in installing it, after the respective unit displays 120 are set as stacked in a plurality of steps, the above mentioned wire 127 may be cut off and removed. Thereby, after the installation, even when a projected image is seen on the screen 126, the wires 127 will not be in the way at all. Even after the wire 127 is cut off, the screen 126 will be pressed against the screen fitting frame 123 by the locking pieces 124a or locking pawls 124b of the pad and therefore will not be disengaged.

Figure 23:
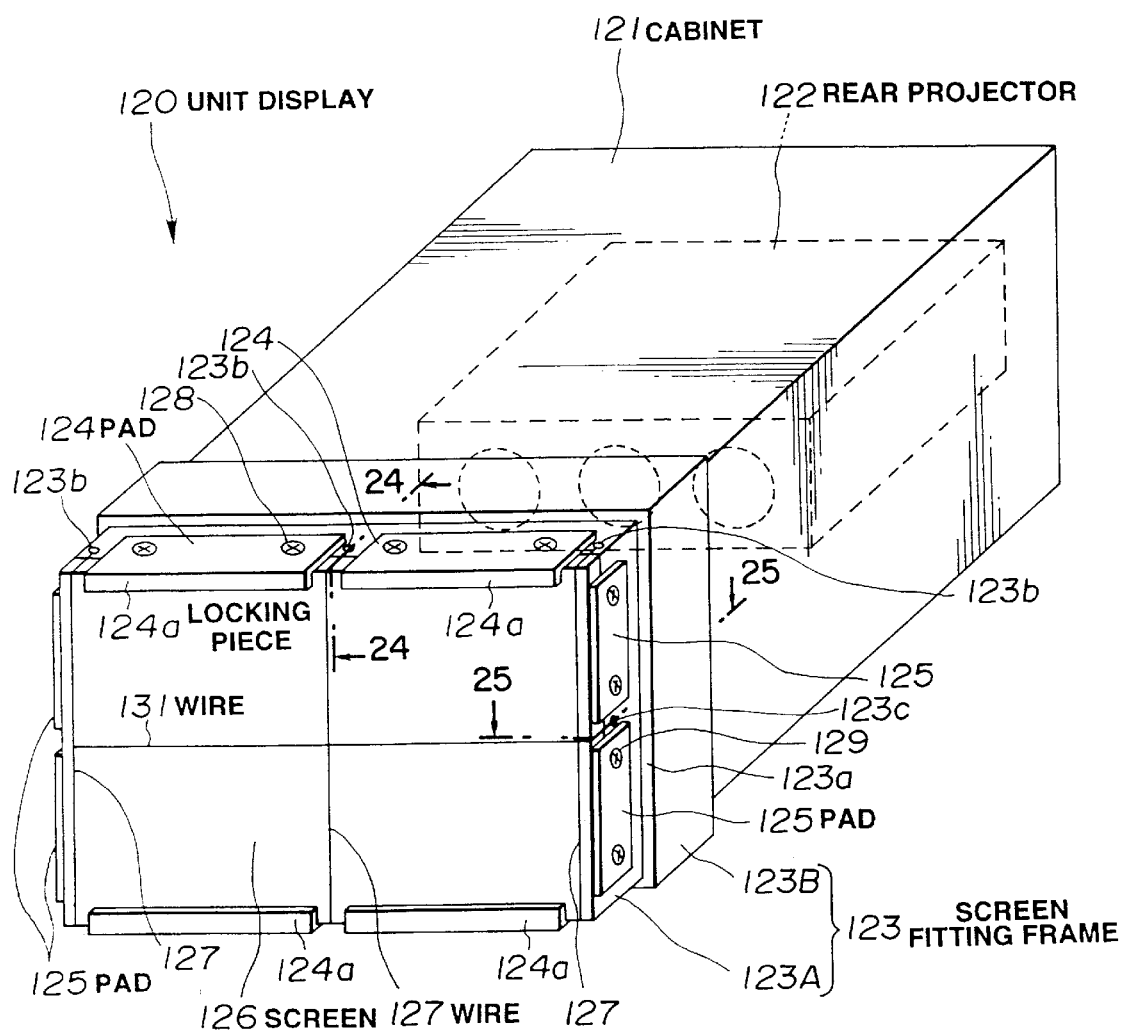
FIG. 23 is a perspective view showing the unit display in the fifth embodiment of a multiscreen display of the present invention.
Figure 24:
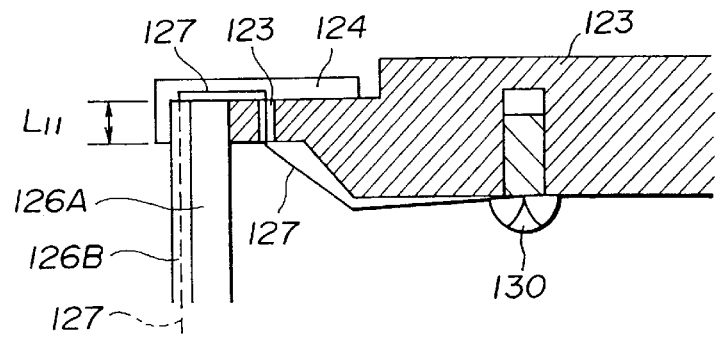
FIG. 24 is a sectioned view on line 24—24 in FIG. 23.
Figure 25:
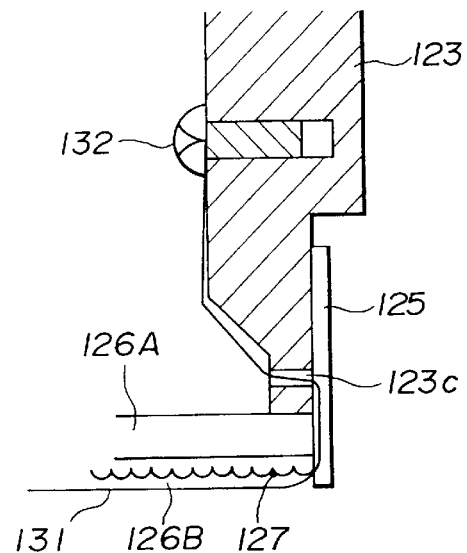
FIG. 25 is a sectioned view on line 25—25 in FIG. 23.

FIG. 23 is a perspective view showing a unit display in the fifth embodiment of a unit display of the present invention. FIG. 24 is a sectioned view on line 24—24 in FIG. 23. FIG. 25 is a sectioned view on line 25—25 in FIG. 23. The same elements as in FIG. 15 shall be explained by attaching the same reference numerals.

In the embodiment in FIG. 23, in addition to the wire 127 in the vertical direction on the screen 126 shown in the embodiment in FIG. 15, one wire 131 is added in the horizontal direction on the screen 126.

Concretely, the difference from the embodiment in FIG. 15 is that the pad 125 arranged on each of the right and left surfaces of the screen fitting frame 123 is divided into two pads, a pair of right and left through holes 123c are provided in the positions between these two pads 125, a wire 131 is passed through these holes 123c, and that wire is stretched in the horizontal direction. The other formations are the same as in FIG. 15.

Therefore, in the vertical direction, the same as in the embodiment in FIG. 15, three wires 127 are stretched so as to be along the vertical groove of the lenticular lens 126B. The structures of stretching the wires 127 and 131 in the vertical and horizontal directions are similar to each other as shown in FIGS. 24 and 25. As shown in FIG. 24, the wire 127 in the vertical direction is the same as in the above described FIG. 17. As shown in FIG. 25, the wire 131 in the horizontal direction passes on the surface of the lenticular lens 126B of the screen 123, passes through the hole 123c provided in the screen fitting frame 123 and is locked to the fixing screw 132 on the inner surface of the screen fitting frame 123.

According to the above mentioned formation, in addition to the three wires 127 in the vertical direction, one wire 131 is added to the center in the horizontal direction, the swell of the screen 126 is pressed in by the wire tension in both vertical and horizontal directions and the screen holding force can be improved. Thereby, the dimension L11 of the locking piece 124 for preventing the floating of the upper and lower ends of the screen 126 can be made further smaller. That is to say, in order to stretch the wires 127 and 131 in a cruciform, a twofold effect will be developed to prevent the bending of the screen 126.

The wire 131 provided in the horizontal direction passes through the center of the screen 126, is made horizontal so as to be stretched in a cruciform with the wire 127 in the center of the screen in the vertical direction and is also a criterion of adjusting the linearity of convergence.

Figure 26:
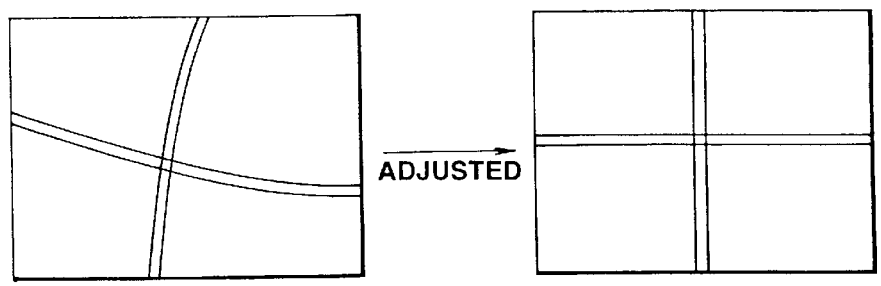
FIG. 26 is an explanatory view showing the linearity adjustment of the convergence in the embodiment in FIG. 23.

Such video image of a cruciform pattern or grid pattern as is shown in FIG. 26 is displayed on the screen 26 to adjust the linearity of convergence. At this time, the position of the cruciform pattern or grid pattern may be adjusted to coincide with the center of the cruciform wires.

According to the above described embodiment in FIG. 23, in case a multiscreen is made by stacking unit displays in steps, the joint between the unit displays will be able to be controlled to be very small. The criterion of adjusting the linearity of convergence can be made also by the cruciform wires.

By the way, as another embodiment relating to the embodiment in FIG. 23, in conveying the unit display 120, the screen 126 is pressed against the screen fitting frame 123 with a plurality of wires 127 and 131 and the peripheral end of the screen is pressed with the pad 124 having the locking pieces 124a or locking pawls 124b (See FIG. 20). In fitting, respective unit displays 120 are set as stacked in a plurality of steps or further the convergence is adjusted and then the above mentioned wires 127 and 131 may be cut off and removed. Thereby, after the installation, when the projected picture on the screen 126 is seen, the wires 127 and 131 will not be in the way at all. Further, even after the wires 127 and 131 are cut off, the screen 126 will be pressed against the screen fitting frame 123 by the locking pieces 124a or locking pawl 124b and will not be disengaged.

Figure 27:
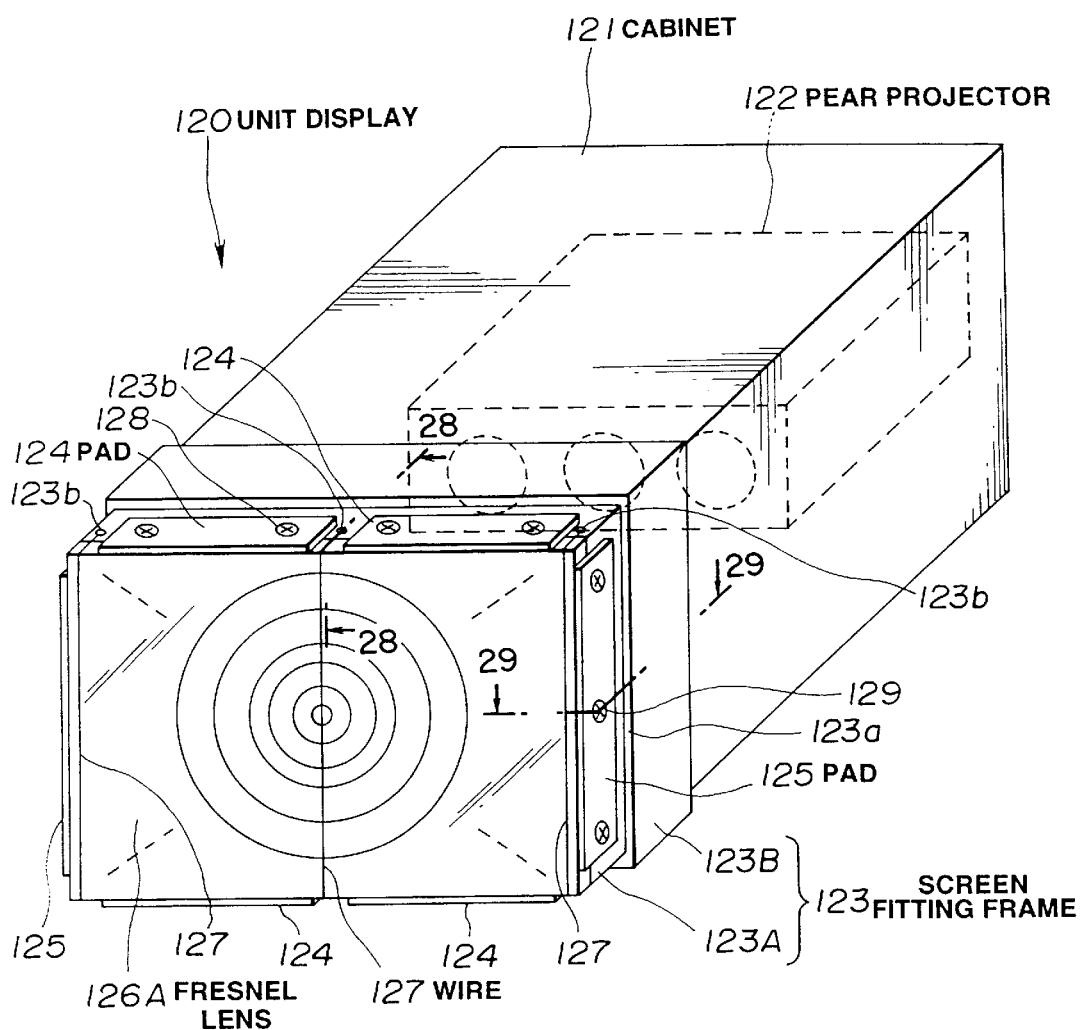
FIG. 27 is a perspective view showing the unit display in the sixth embodiment of a multiscreen display of the present invention.
Figure 28:
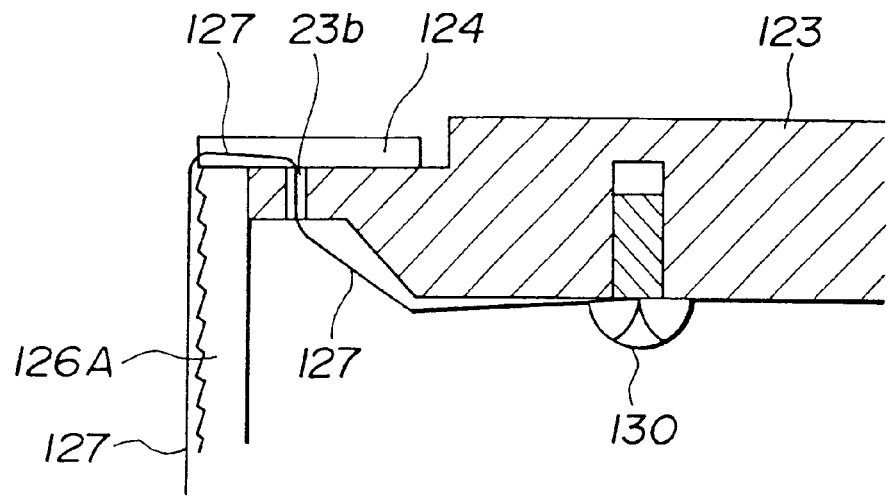
FIG. 28 is a sectioned view on line 28—28 in FIG. 27.
Figure 29:
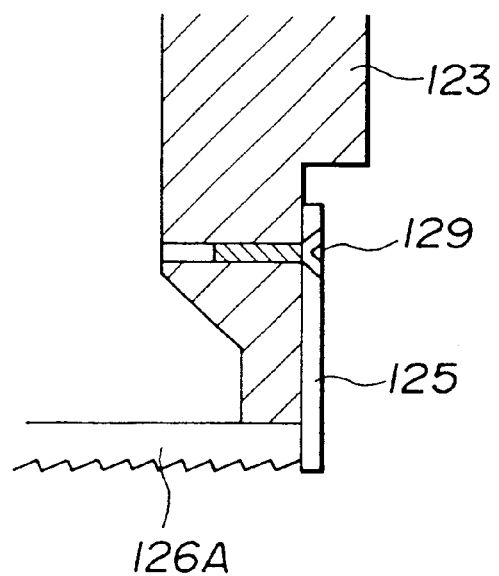
FIG. 29 is a sectioned view on line 29—29 in FIG. 27.
Figure 30:
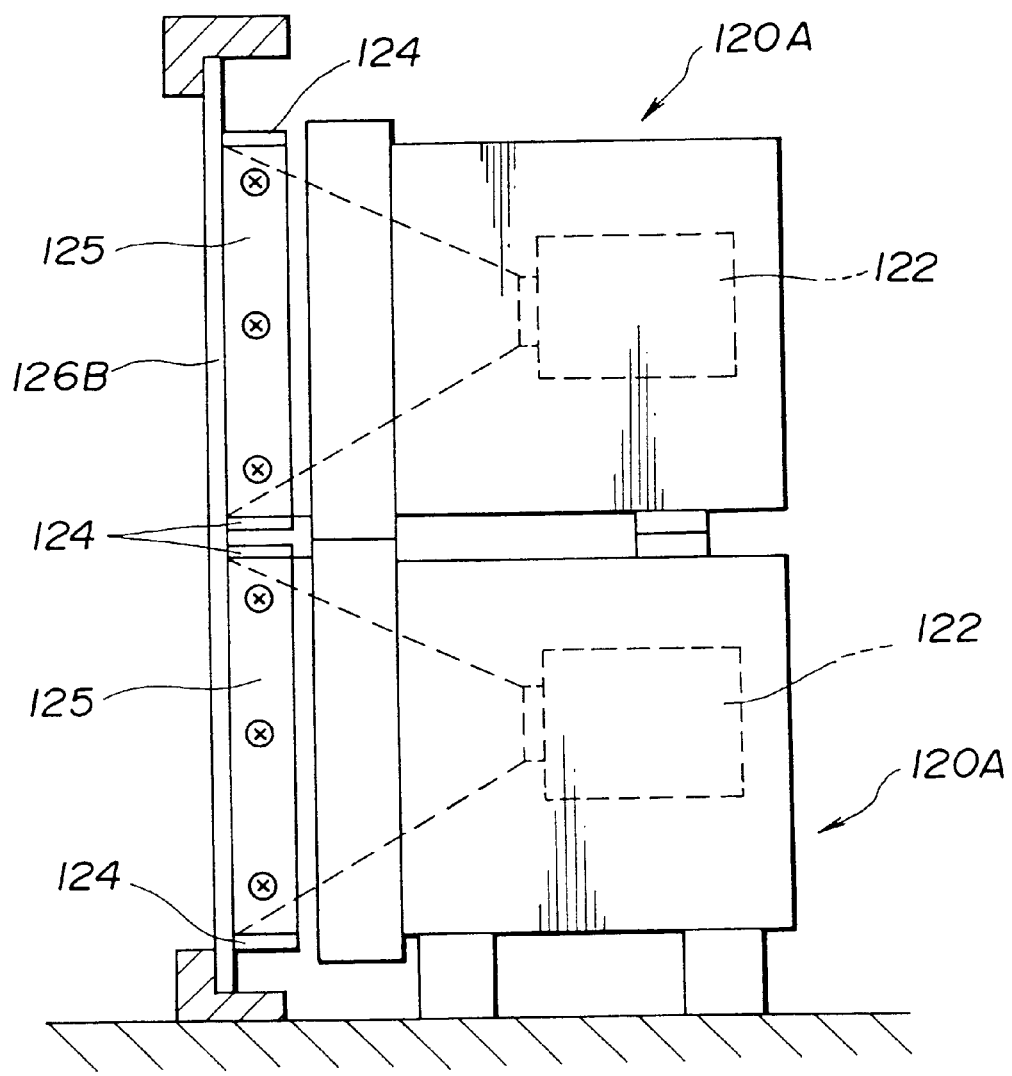
FIG. 30 is a side view showing a multiscreen display assembled by using a lenticular lens made integral with the unit display in FIG. 27.

FIG. 27 is a perspective view showing the unit display in the sixth embodiment of a unit display of the present invention. FIG. 28 is a sectioned view on line 28—28 in FIG. 27. FIG. 29 is a sectioned view on line 29—29 in FIG. 27. FIG. 30 is a side view of a multiscreen as made by stacking in steps the unit displays in FIG. 27. The same elements as in FIG. 15 shall be explained by attaching the same reference numerals.

The difference of the embodiment in FIG. 27 from the embodiment in FIG. 15 is that only the Fresnel lens 126A of the screen (formed of the two lenses of a lenticular lens and Fresnel lens) is fixed to the screen fitting frame 123 with a plurality (three in the drawing) of wires 127 thinner than the vertical groove width of the lenticular lens and the pads 124 and 125 pressing the outer peripheral end surface of the Fresnel lens 126A. As shown in FIG. 14, the wire 127 passes on the surface of the Fresnel lens 126A having a spiral groove, passes through a through hole 123c provided in the screw fitting frame 123 and is locked to a fixing screw 130 on the inner surface of the screen fitting frame 123. The pad 124 used here is different from that in the embodiment in FIG. 15 and has no locking piece 124 for locking the upper and lower ends of the screen. Therefore, the pads 124 and 125 have no locking part covering the screen surface and, when the unit displays 120A are stacked up in steps, the joint will be able to be further reduced.

In making a multiscreen by stacking a plurality of unit displays 120A having the Fresnel lenses 126A (shown in FIG. 27) incorporated, the lenticular lens 126B made one is arranged adjacently to the Fresnel lens 126A on the front surface of the plurality (four in the drawing) of the stacked unit displays 120A as shown in FIG. 30 so that a screen is formed from the two lenses of the inherent lenticular lens and Fresnel lens.

The pads 124 and 125 have also the same function as of the shielding plate of the conventional example. The plurality of fixing wires 127 are thinner than vertical groove width of the lenticular lens 126B. For that reason, they will be mixed into the vertical groove of the lenticular lens 126B and will not be substantially conspicuous at an optimum sighting distance particularly when the picture is made large by the multiscreen or the like.

Further, when no image is projected by the projector 122, these wires 127 and the pads 124 and 125 will hide behind the lenticular lens 126B and will be seen only as one screen.

When the wire fixing the Fresnel lens 126 are stretched in the horizontal direction and so as to pass through the center of the Fresnel lens 126A, a cruciform will be formed in the above described vertical direction with the wire 127 passing through the center of the Fresnel lens. This will provide a means for adjusting the linearity of convergence.

Figure 60:
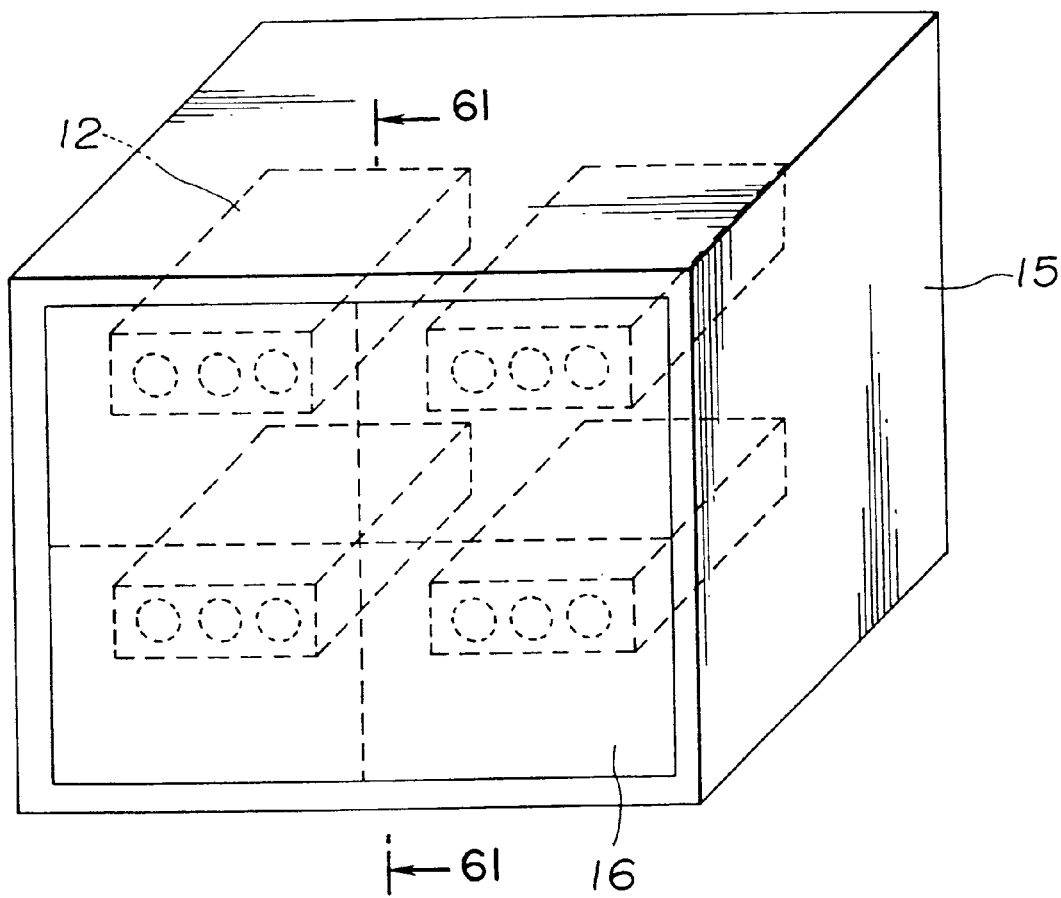
FIG. 60 is a perspective view of a multiscreen display of another conventional example.
Figure 61:
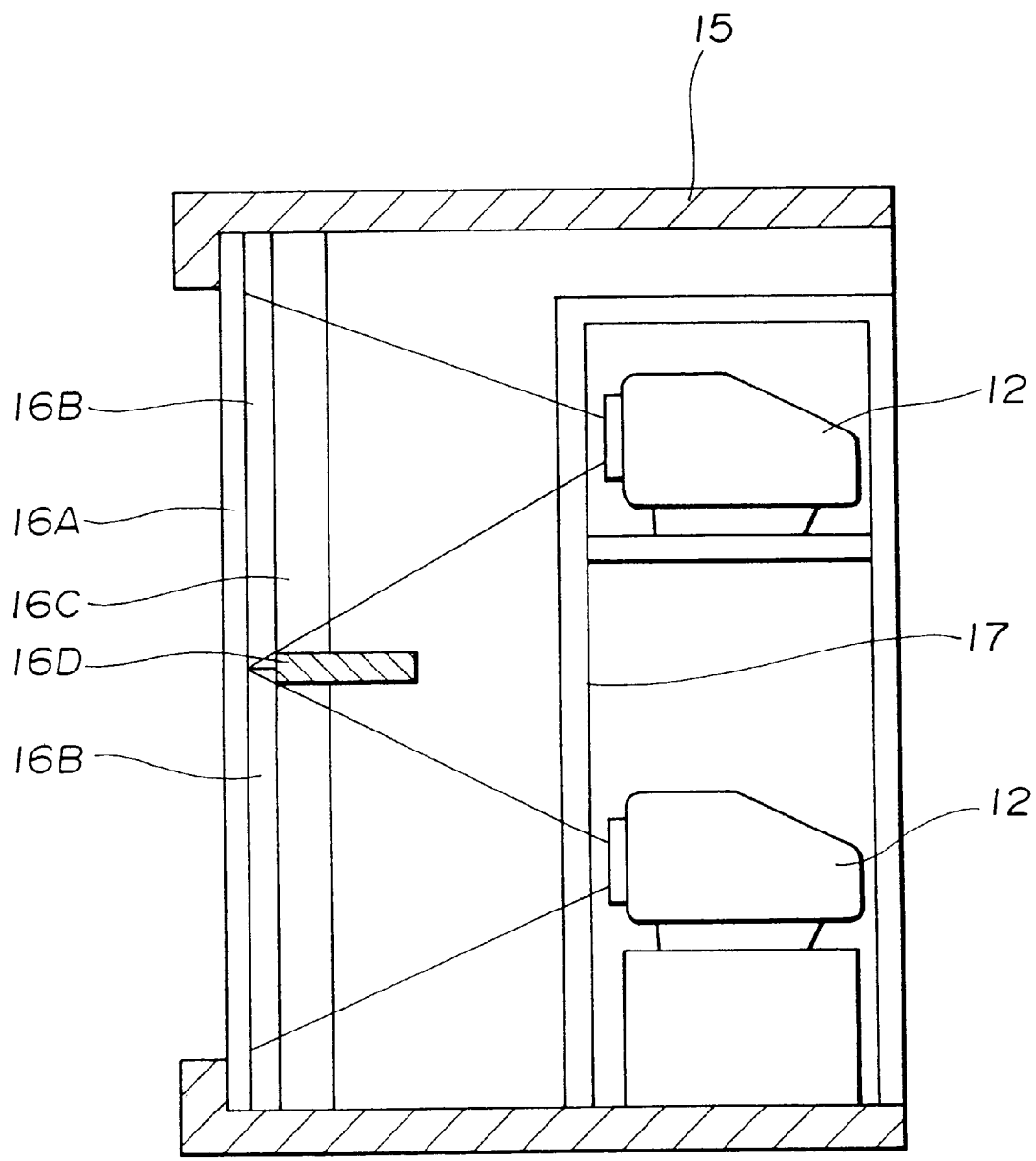
FIG. 61 is a sectioned view on line 61—61 in FIG. 60.

According to the above described embodiment in FIG. 27, when a multiscreen is made by stacking in multisteps and the unit displays 120A have only the Fresnel lenses 126A arranged on the front surfaces, the joint between the respective unit displays 120A will be able to be completely hidden. That is to say, as compared with the conventional examples in FIGS. 60 and 61, a multiscreen can be made as combined with the lenticular lens 126B while securing a structure easy to handle and install the unit displays 120A in this embodiment.

According to the above described embodiments in FIGS. 15 to 30, the dimensions of the parts for fixing the screen can be kept minimum, further the screen holding force can be improved, the joint when the unit displays are stacked in steps can be minimized, the information amount of the picture can be made large, the distortion can be reduced, the operability for adjusting the linearity of convergence can be improved and a multiscreen display is easily assembled can be provided.

Figure 31:
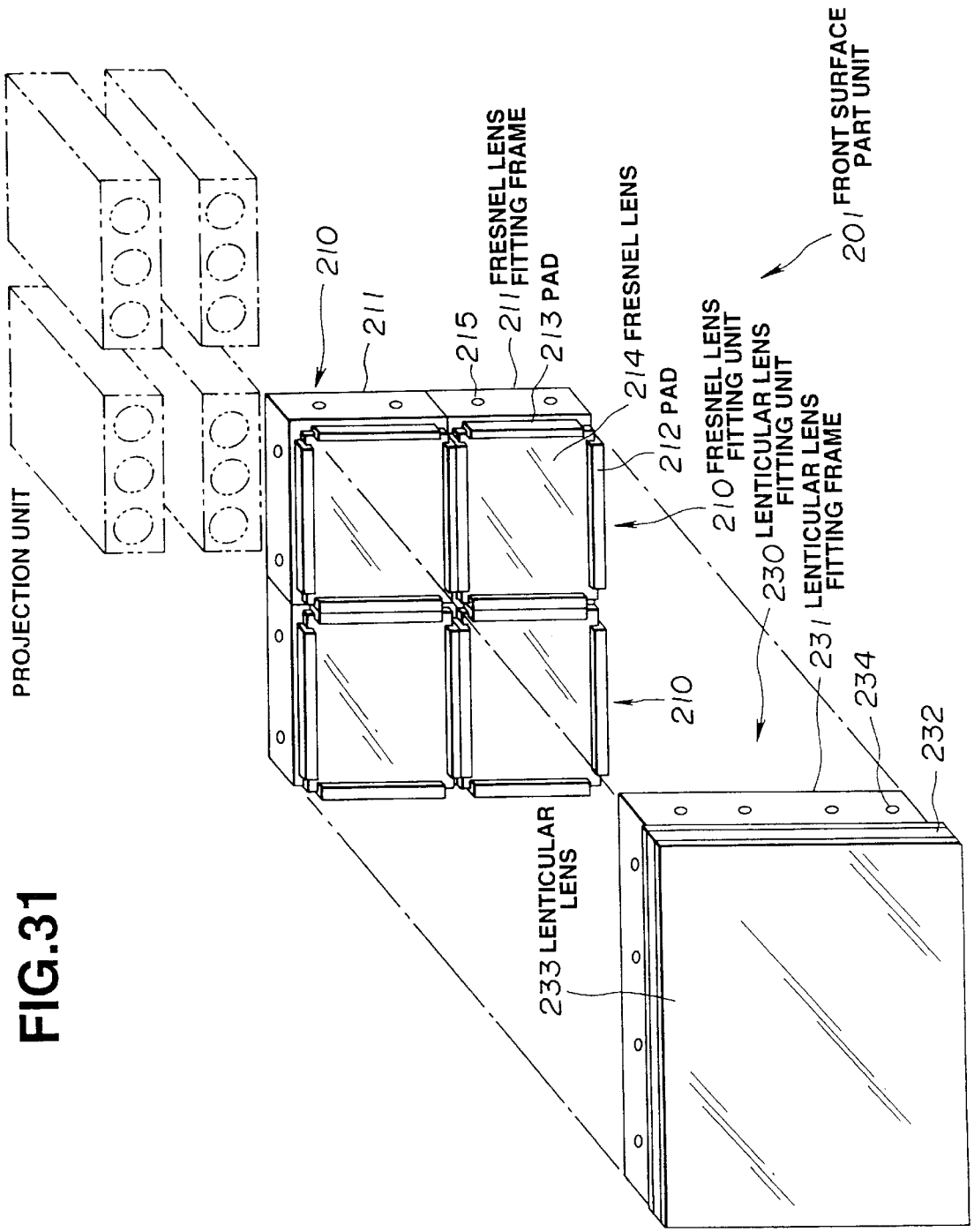
FIG. 31 shows a front surface part unit of the seventh embodiment of a multiscreen display of the present invention and is a disassembled perspective view of a Fresnel lens fitting unit and lenticular lens fitting unit.

FIG. 31 is a disassembled perspective view of a Fresnel lens fitting unit and lenticular lens fitting unit, showing the front surface part unit of the seventh embodiment of a multiscreen display of the present invention.

In FIG. 31, the reference numeral 201 represents a front surface part unit of a multiscreen display of a multiscreen system. In this front surface part unit 201, four Fresnel lens fitting units 210 are assembled as arranged in two vertical rows and two horizontal rows, and a lenticular lens fitting unit 230 is fitted on the front surface sides of the assembled Fresnel lens fitting units 210.

The Fresnel lens fitting unit 210 is fitted with the Fresnel lens 214 on the front surface side of the Fresnel lens fitting frame 211 by the upper and lower pads 212 and right and left pads 213. Four projecting units are arranged on the back surface sides of four Fresnel lens fitting frames 211 so that the lights from the four projecting units may be respectively projected from the back surface side. Two bolt fixing through holes 215 are formed on each of the upper, lower, right and left side surfaces of the Fresnel lens fitting frame 211.

The lenticular lens fitting unit 230 is fitted with the lenticular lens 233 through a reinforcing piece 232 formed to be frame-shaped of such material having a high strength and some degree of resiliency as hard plastics on the front surface side of the lenticular lens fitting frame 231. Four bolt fixing through holes 234 are formed in the positions corresponding to the through holes 215 of the above mentioned Fresnel lens fitting frame 211 on each of the upper, lower, right and left side surfaces of the lenticular lens fitting frame 231. This front surface part unit 201 forms one multiscreen of such Fresnel lens fitting units 210 and lenticular lens fitting unit 230.

Figure 32:
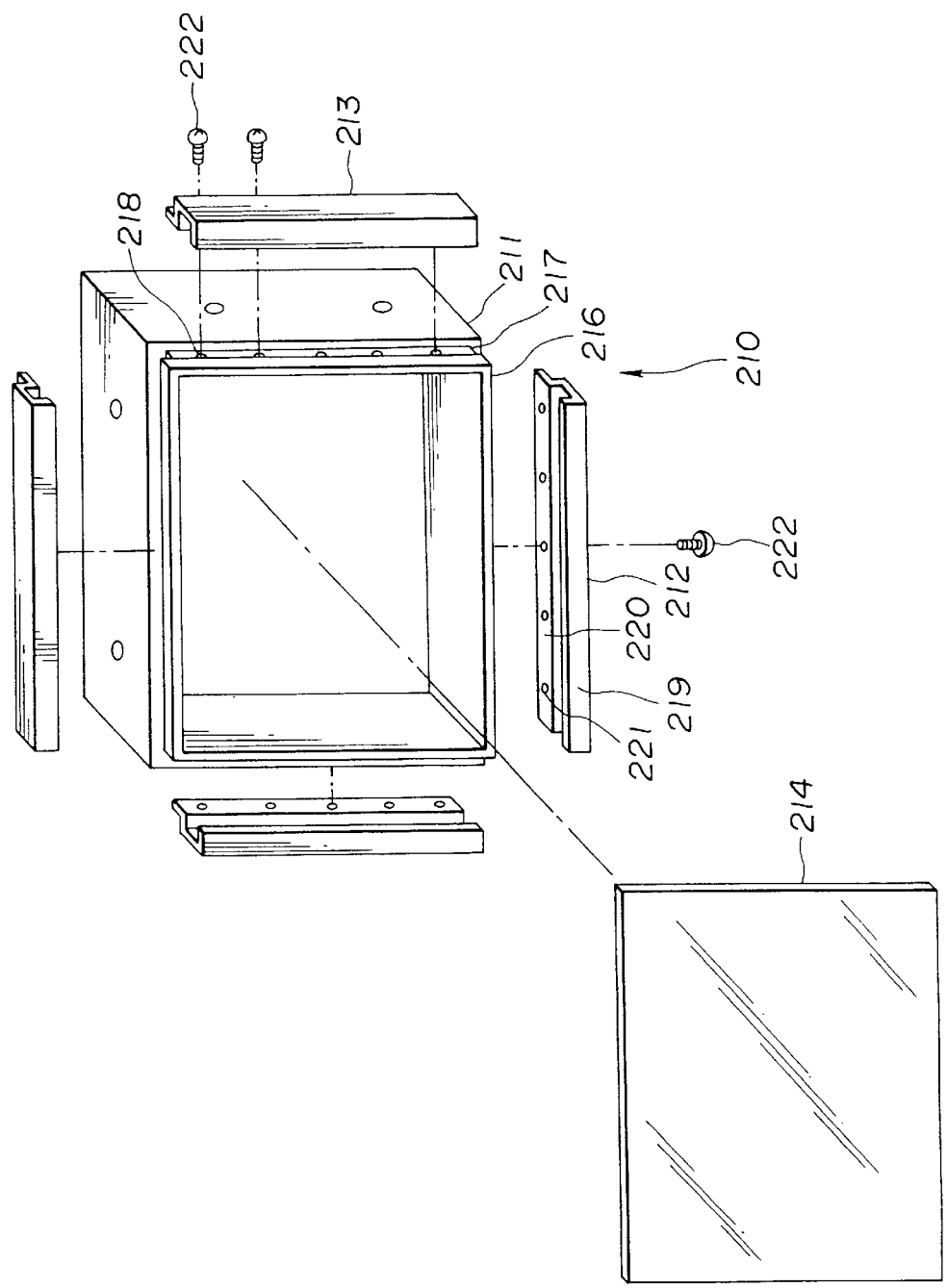
FIG. 32 is a disassembled perspective view showing the Fresnel lens fitting unit in FIG. 31.

FIG. 32 is a disassembled perspective view showing the Fresnel lens fitting unit 210 in FIG. 31.

The Fresnel lens fitting frame 211 of the Fresnel lens fitting unit 210 is formed to be frame-shaped of such high strength material as an aluminum alloy and has a Fresnel lens fitting part 216 formed on the front surface side. The Fresnel lens fitting frame is formed to be smaller in the diameter by the thickness of the pads 212 and 213 than the outer periphery of the Fresnel lens fitting frame 211. A groove part 217 is formed on the back surface side of the Fresnel lens fitting part 216 and has five screw holes 218 formed at regular intervals on each surface.

The pad 212 has a locking piece 219 for locking the Fresnel lens plate 214 formed on the front surface side by bending a metal plate to be channel-shaped and has a screw fixing part 220 formed by bending the back surface side to be L-shaped toward the back surface. This screw fixing part 220 has through holes 221 formed in the positions corresponding to the screw holes 218 of the above mentioned groove part 217. The screw fixing part 220 will be fitted and fixed to the above mentioned groove part 217 when screws 222 are inserted into the through holes and are screwed into the screw holes 218. The pad 213 is of the same structure as of the pad 212 except that only the length is different.

Figure 33:
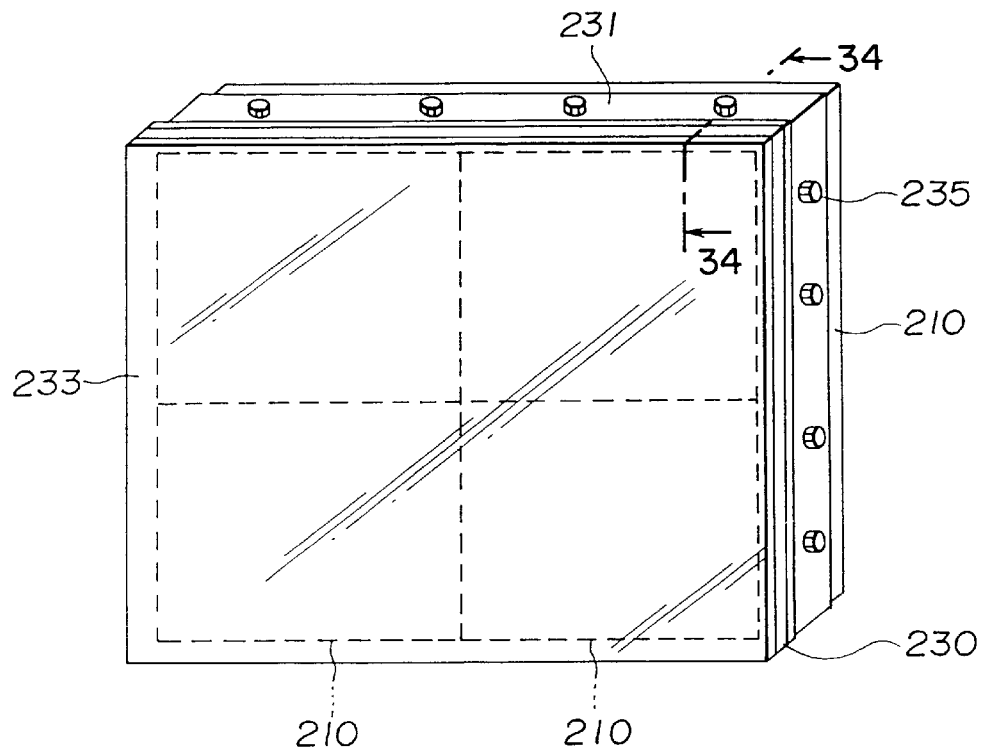
FIG. 33 is a perspective view showing the front surface part in FIG. 31.

FIG. 33 is a perspective view showing the front surface part in FIG. 31.

In FIG. 33, when the Fresnel lens fitting units 210 assembled in two vertical rows and two horizontal rows are inserted from the back surface side, the lenticular lens fitting unit 230 will be fitted to the Fresnel lens fitting units 210 assembled with bolts 235 so that the Fresnel lens 214 may be arranged on the back surface side of the lenticular lens 233.

Figure 34:
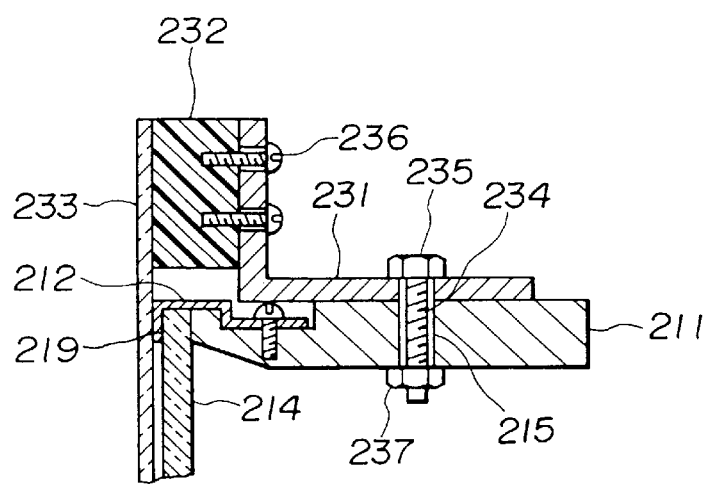
FIG. 34 is a sectioned view on line 34—34 in FIG. 33.

FIG. 34 is a sectioned view on line 34—34 in FIG. 33. As shown in this drawing, the lenticular lens fitting frame 231 of the lenticular lens fitting unit 230 is formed to be L-shaped with the front surface side directed outside and a reinforcing piece 232 is screwed and fixed by screws 236 in this part. The lenticular lens 233 is fitted by bonding on the front surface side of the reinforcing piece 232. The bolt 235 is inserted through the through hole 234 of the lenticular lens fitting frame 231 and through the through hole 215 of the Fresnel lens fitting frame 211 and is screwed into a nut 237 to fix the lenticular lens fitting frame 231 and Fresnel lens fitting frame 211. In this state, the locking piece 219 of the pad 212 locking the Fresnel lens 214 will be in contact with the back surface side of the lenticular lens 233.

Figure 35:
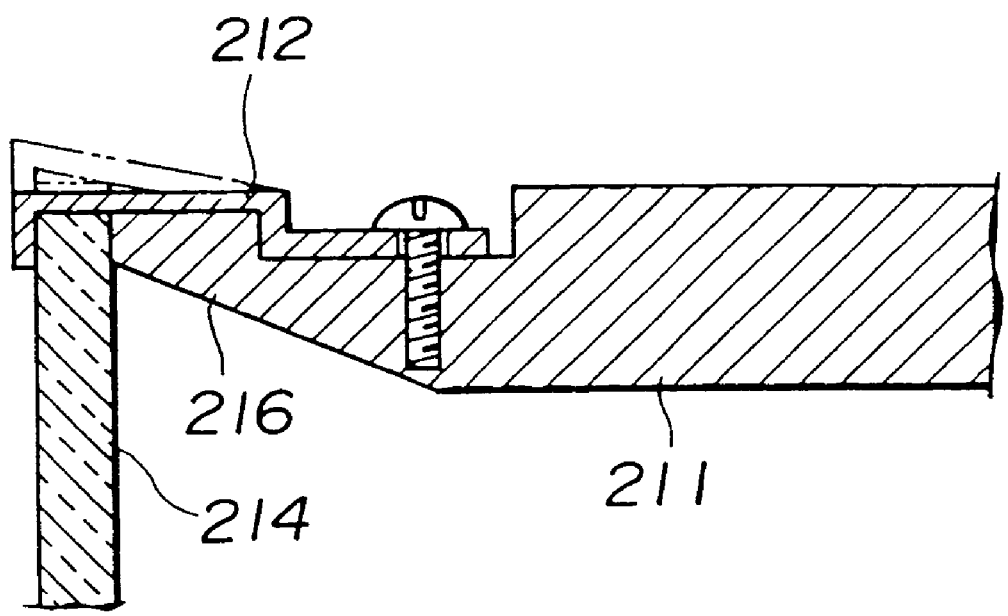
FIG. 35 is a sectioned view showing as magnified a pad and its peripheral part in FIG. 34.

FIG. 35 is a sectioned view showing the pad and its peripheral part in FIG. 34 as magnified.

The pad 212 has a resiliency. In case the Fresnel lens 214 expands to the state of the broken line from the state of the solid line due to the temperature rise, the pad 212 will bend outside to apply an inside directed force to the Fresnel lens 214. Here, the outer periphery of the Fresnel lens fitting part 216 and the outer periphery of the Fresnel lens 214 are set so as to coincide with each other at about −20 degrees below the freezing point which is a lower limit of the general atmospheric temperature. Therefore, at the normal temperature, the pad 212 will always apply an inside directed force to the Fresnel lens 214.

Figure 36:
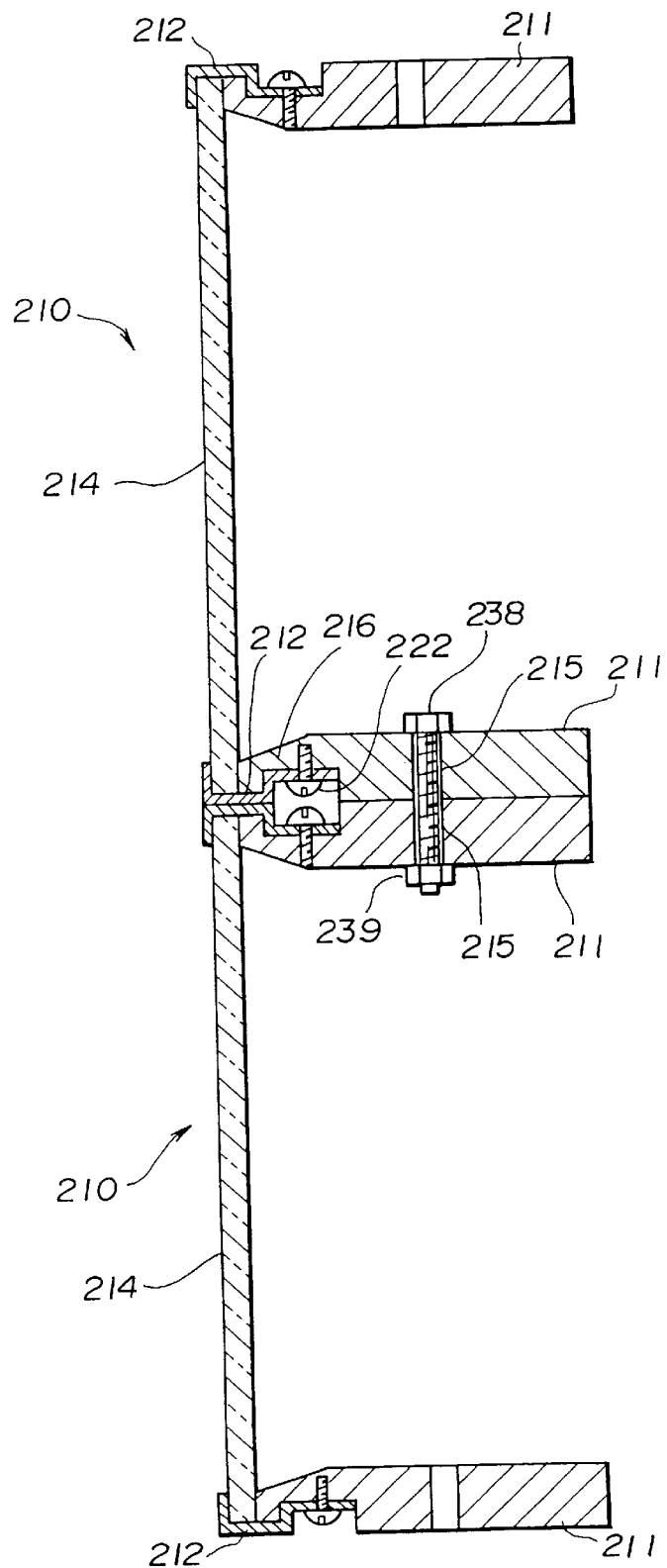
FIG. 36 is a sectioned view showing the Fresnel lens fitting unit in FIG. 33.

FIG. 36 is a sectioned view showing the Fresnel lens fitting unit 210 as assembled.

When the Fresnel lens fitting units 210 are as assembled, the through holes 215 of the adjacent Fresnel lens fitting frames 211 will communicate with each other. The bolt 238 will be inserted through such communicating through holes 215 and screwed into the screw hole of the nut 239 to fix the adjacent Fresnel lens fitting frames 211. Here, as the Fresnel lens fitting part 216 of the Fresnel lens fitting frame 211 is formed to be smaller in the diameter by the thickness of the pad 211, the adjacent pads 212 will be in contact with each other. Further, as a step part 217 is formed in the Fresnel lens fitting part 216 and the screwed part 220 of the pad 212 is bent in conformity to the step part 217, the screws 222 will not contact with each other. Further, in case Fresnel lens 214 expands or contracts, the Fresnel lens 214 will be stably held by the spring effect of the pad 212.

Figure 37:
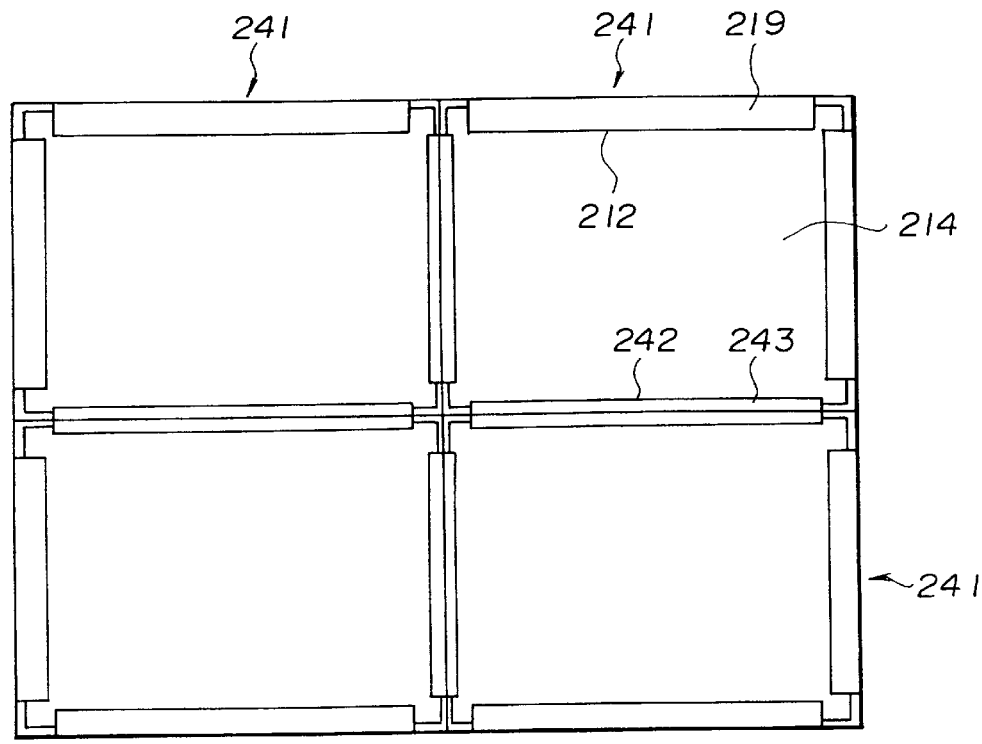
FIG. 37 is a front surface view a Fresnel lens fitting unit showing a modification of the embodiment in FIG. 31.
Figure 62:
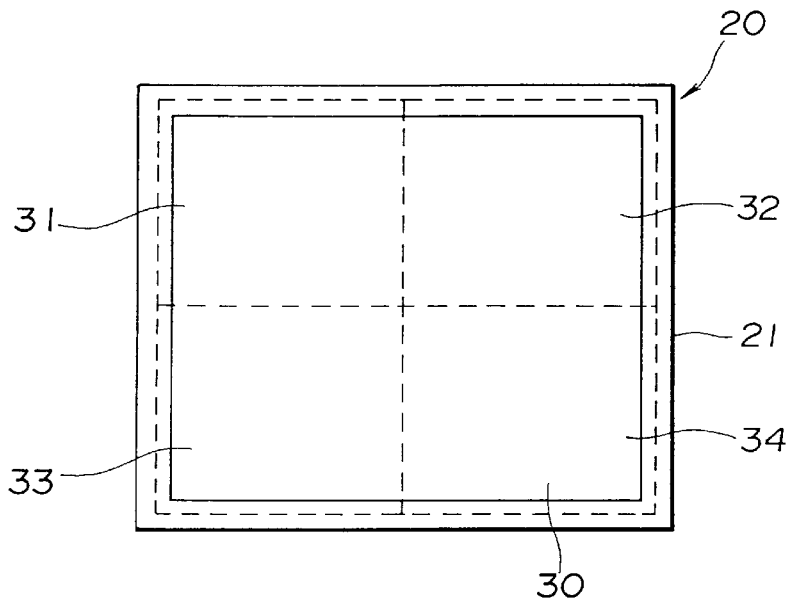
FIG. 62 is a side view showing the front surface part of a conventional multiscreen display.
Figures 63, 64:
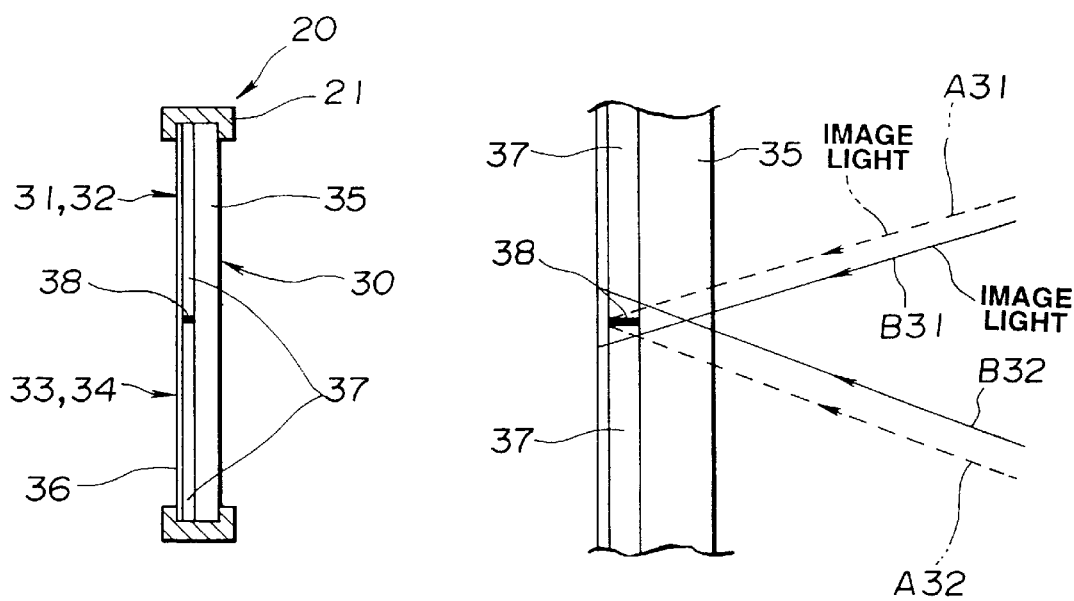
FIG. 63 is a sectioned view of a front surface part of FIG. 62.
FIG. 64 is an explanatory view explaining the prevention of the interference with image lights of the multiscreen display in FIG. 63.

According to such embodiment, in the front surface part unit 201 of the multiscreen display, even when the lag of the image lights from the projecting units is large, by the Fresnel lens fitting frame 211 of the lenticular lens fitting unit 210, the image light from the projecting unit can be prevented from being projected to a Fresnel lens corresponding to another projecting unit and the image lights can be prevented from interfering with each other. Further, in the front surface part unit 201 of the multiscreen display, the lenticular lens fitting unit 230 can be removed by removing the bolts 235 (See FIGS. 33 and 34) to the front surface side from the Fresnel lens fitting units 210 as assembled, the Fresnel fitting units 210 can be disassembled one by one by removing the bolts 238 and therefore such handlability as in moving, conveying and installing them can be improved. Further, the Fresnel lens 214 is individually fitted by the Fresnel lens fitting frame 211 formed of such light and tough material as an aluminum alloy and therefore the structure is lighter than in the conventional example shown in FIG. 62, FIG. 37 is an elevation of the Fresnel lens fitting unit as assembled, showing a modification of the embodiment in FIG. 31. The same components as in the embodiment in FIG. 31 shall bear the same reference numerals and shall not be explained.

In FIG. 37, the difference of this embodiment is that the locking piece 243 of the pad (inside pad) 242 positioned on the adjacent surfaces of the Fresnel lens fitting units 241 as assembled is formed to be shorter in the width to the Fresnel lens 214 side than the locking piece 219 of the pad (outer peripheral side pad) 212 positioned on the outer periphery. The other formations than this are the same as in the embodiment in FIG. 1.

Figure 38:
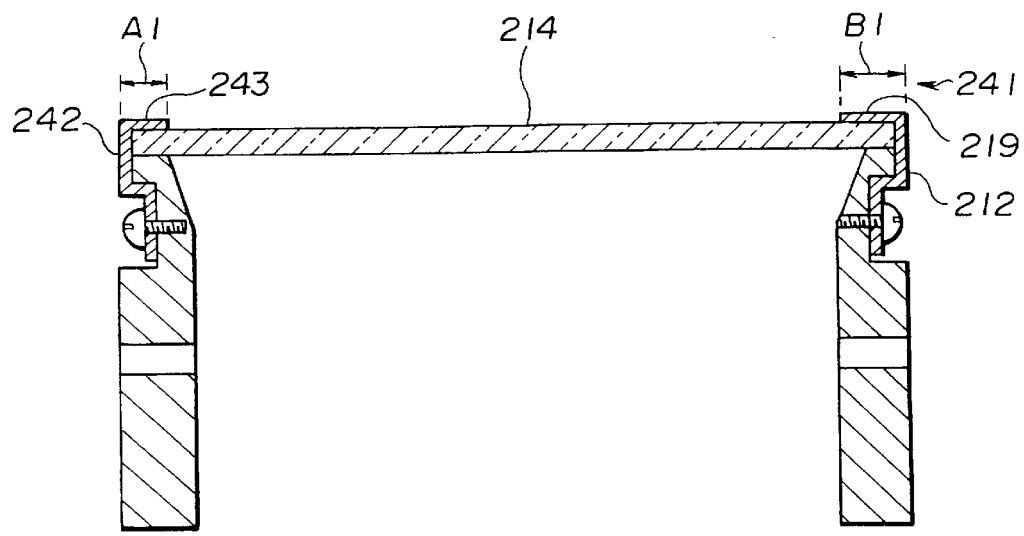
FIG. 38 is a sectioned view of the Fresnel lens fitting unit in FIG. 37.

FIG. 38 is a sectioned view of the Fresnel lens fitting unit 241 in FIG. 37.

In FIG. 38, the width A1 of the locking piece 243 of the pad 242 on the surface of the Fresnel lens fitting unit adjacent to the other Fresnel lens fitting unit 241 is formed to be a width about half the width B1 of the locking piece 219 of the pad 212 on the outer periphery. Here, when the Fresnel lens fitting unit 241 is assembled, the adjacent pads 42 will be in contact with each other and the pad 242 will not bend and, even if the locking piece 243 is short, the Fresnel lens 214 will be able to well prevent the Fresnel lens 214 from dropping.

According to such modification, the locking piece 243 between the adjacent Fresnel lenses 214 can be made inconspicuous and therefore a high impression can be given to the receivers.

Figure 39:
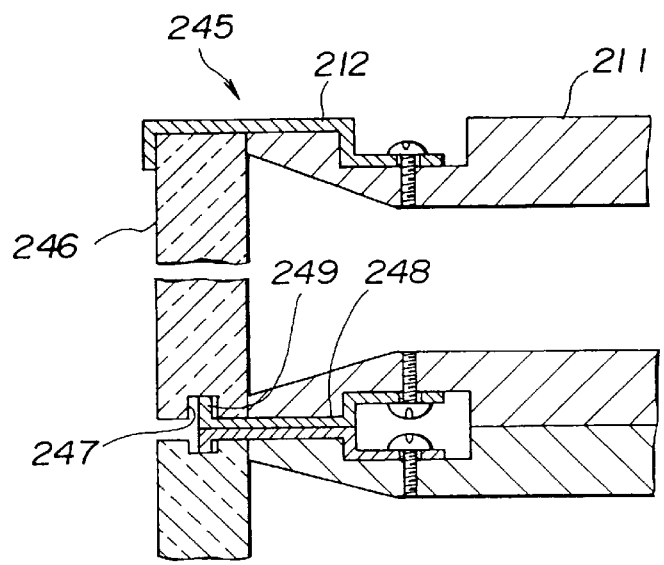
FIG. 39 is a sectioned view of an essential part showing the eighth embodiment of a multiscreen display of the present invention.

FIG. 39 is a sectioned view of an essential part, showing the eighth embodiment of a multiscreen display of the present invention. The same components as in FIG. 31 shall bear the same reference numerals and shall not be explained.

In FIG. 39, the Fresnel lens 246 of the Fresnel lens fitting unit 245 has a groove part 247 formed in an intermediate position in front and rear of the side surface adjacent to the other Fresnel lens 246. The pad 248 positioned on the surface adjacent to the Fresnel lens fitting units 245 as assembled has the locking piece 249 formed in the position corresponding to the above mentioned groove part 247. The other formations are the same as in the embodiment in FIG. 31.

According to such embodiments, the locking piece 249 between the adjacent Fresnel lenses 246 can be made more inconspicuous and has the effects shown in the following.

Figure 40:
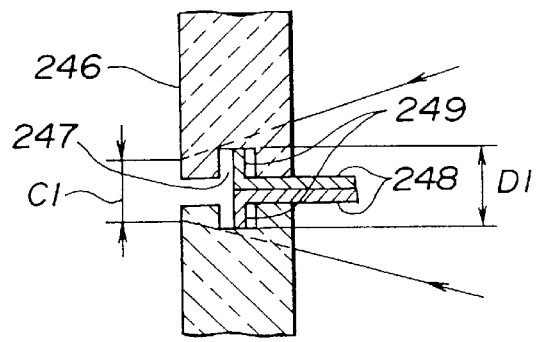
FIGS. 40(a)—40(b) are explanatory views showing the effect of the embodiment in FIG. 39.
Figure 40:
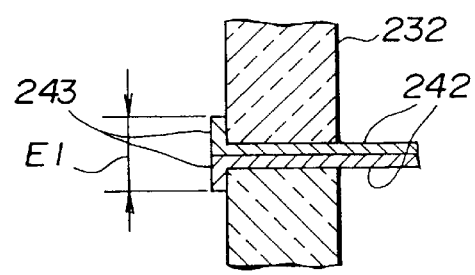

FIGS. 40(a) and 40(b) are explanatory views showing the effects of such embodiments. FIG. 40(a) shows the locking piece and its peripheral part of the embodiment in FIG. 39. FIG. 40(b) shows the locking piece and its peripheral part of the embodiment in FIG. 37.

The width D1 of the locking pieces 249 consisting of the laminated pads 48 in this embodiment shown in FIG. 40(a) is set to be the same as the width E1 of the locking pieces 243 consisting of the laminated pads 242 in the embodiment in FIG. 37 shown in FIG. 40(b). However, as shown in FIG. 40(a), as the groove part 247 is formed on the back surface side rather than on the surface of the Fresnel lens 246, the width C1 produced when the image light is shielded by this groove part 247 will be smaller than the width E1 by the locking pieces 243 shown in FIG. 40(b). As a result, the boundary of the image can be made more inconspicuous than in the embodiment in FIG. 37. In this case, the diffused reflection of the image light may be considered. However, in this case, it will be able to be solved by black painting.

Figure 41:
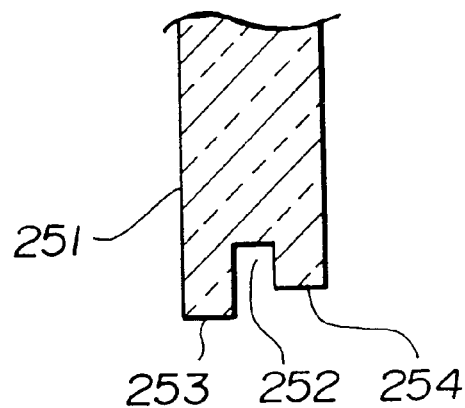
FIG. 41 is a sectioned view showing an essential part of a modification of the embodiment in FIG. 39.

FIG. 41 is a sectioned view showing the essential part of the modification of the embodiment in FIG. 39.

In the embodiment in FIG. 41, the front surface side 253 rather than the groove part 252 of the Fresnel lens 251 is formed to be longer by ½ the thickness of the pad than the back surface side 254.

Figure 42:
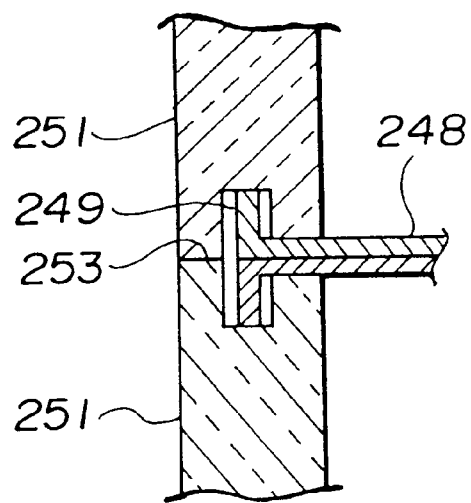
FIG. 42 is a sectioned view showing as assembled a Fresnel lens fitting unit in the modification in FIG. 41.

FIG. 42 is a sectioned view showing the Fresnel lens fitting unit as assembled of the modification in FIG. 41.

In FIG. 42, in the Fresnel lens fitting unit as assembled, the front surface sides 253 of the adjacent Fresnel lenses 251 are in contact with each other and therefore the boundary of the Fresnel lenses 251 can be made more inconspicuous. When the projecting unit is off, the locking piece 249 of the pad 248 as seen from the semitransparent lenticular lens will be substantially invisible and a more favorable impression will be made available to the receivers.

Figure 43:
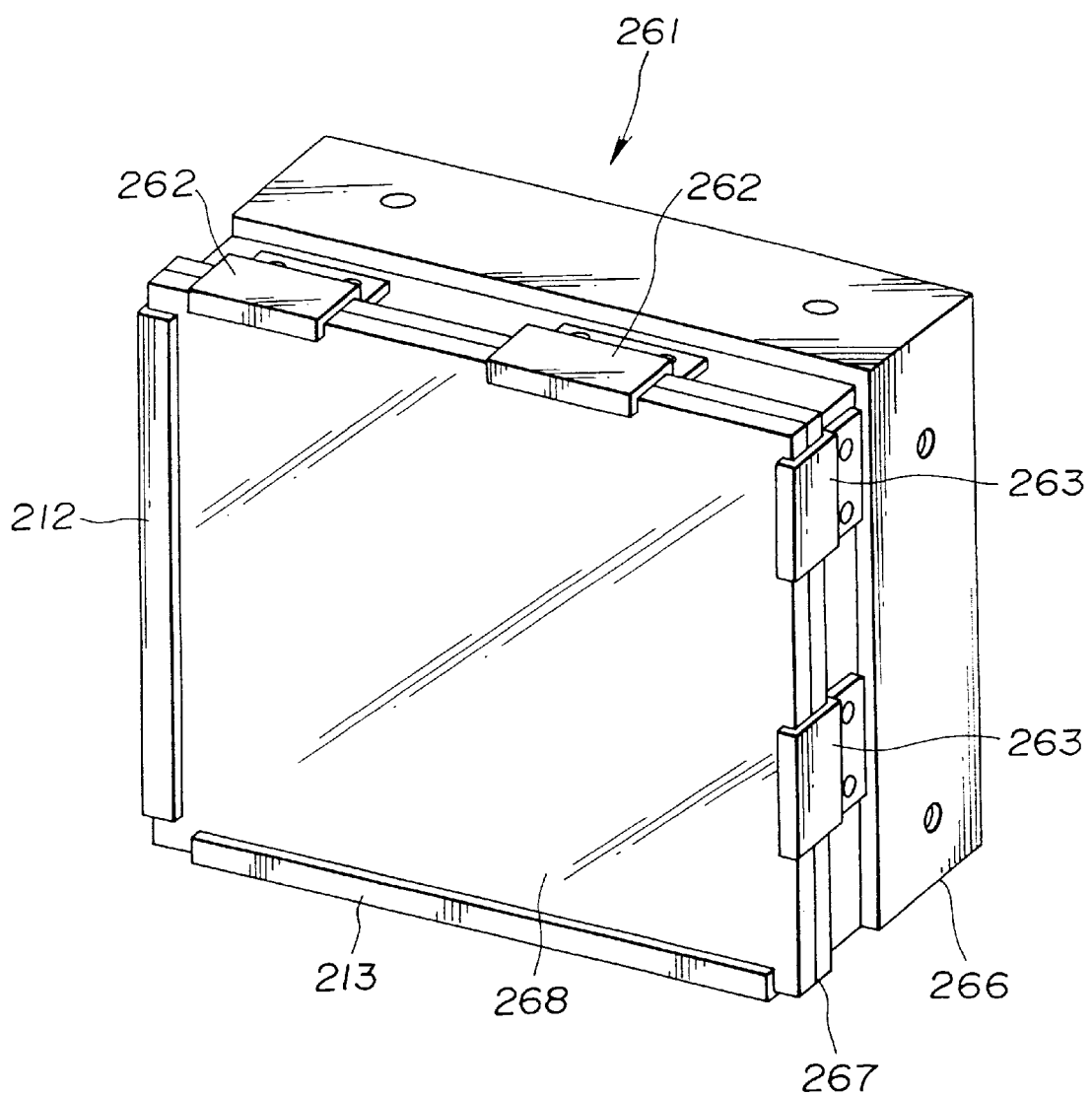
FIG. 43 is an elevation of a Fresnel lens fitting unit showing the ninth embodiment of a multiscreen display of the present invention.

FIG. 43 is an elevation of the Fresnel lens fitting unit, showing the ninth embodiment of a multiscreen display of the present invention. The same components as in FIG. 31 shall bear the same reference numerals and shall not be explained.

In FIG. 43, two pads (inside pads) 262 are provided on each of the upper and lower adjacent surfaces of the Fresnel lens fitting unit 261. Also, two pads 263 are provided on each of the right and left adjacent surfaces of the Fresnel lens fitting unit 261. The pads 262 and 263 are formed respectively to be somewhat smaller than ¼ the outer peripheral pads (outer peripheral side pads) 212 and 213. The Fresnel lens 268 is fitted to the fitting part 267 of the Fresnel lens fitting frame 266.

Figure 44:
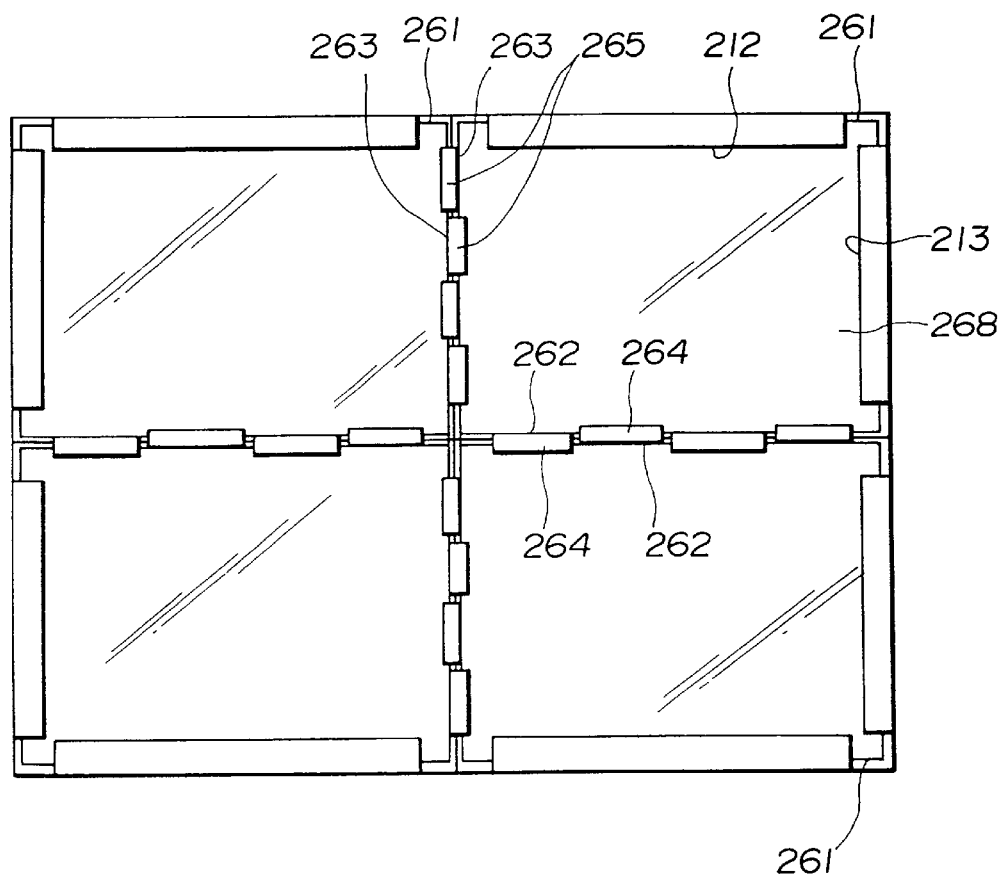
FIG. 44 is an elevation showing as assembled the Fresnel lens fitting unit in FIG. 43.

FIG. 44 is an elevation showing the Fresnel lens fitting unit shown in FIG. 43 as assembled.

In FIG. 44, the locking pieces 264 of the pads 262 are provided discontinuously alternately between the upper and lower adjacent Fresnel lens fitting units 261. In the same manner, the locking pieces 265 of the pads 263 are provided discontinuously alternately between the right and left adjacent Fresnel lens fitting unit 261.

Figure 45:
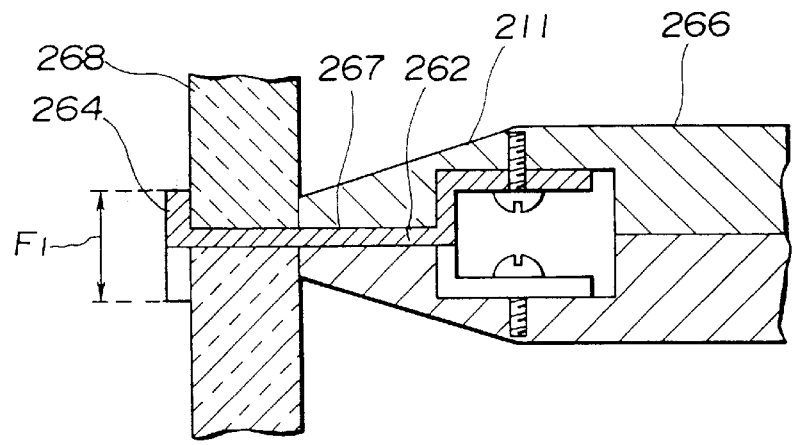
FIG. 45 is a sectioned view showing as assembled the Fresnel lens fitting unit in FIG. 43.

FIG. 45 is a sectioned view showing the Fresnel lens fitting unit shown in FIG. 43 as assembled.

The Fresnel lens fitting part 267 of the Fresnel lens fitting frame 266 is formed to be smaller in the diameter than the outer periphery of the Fresnel lens fitting frame 266 by ½ the thickness of the pad 262 and therefore the pad 262 will be in contact with both of the adjacent Fresnel lens fitting parts 267. Thereby, the width F1 of the shielded part of the Fresnel lens 268 by the locking piece 264 (locking piece 265) can be made smaller than in the embodiment in FIG. 37 by half the thickness of the pad 262 (pad 263).

Figure 46:
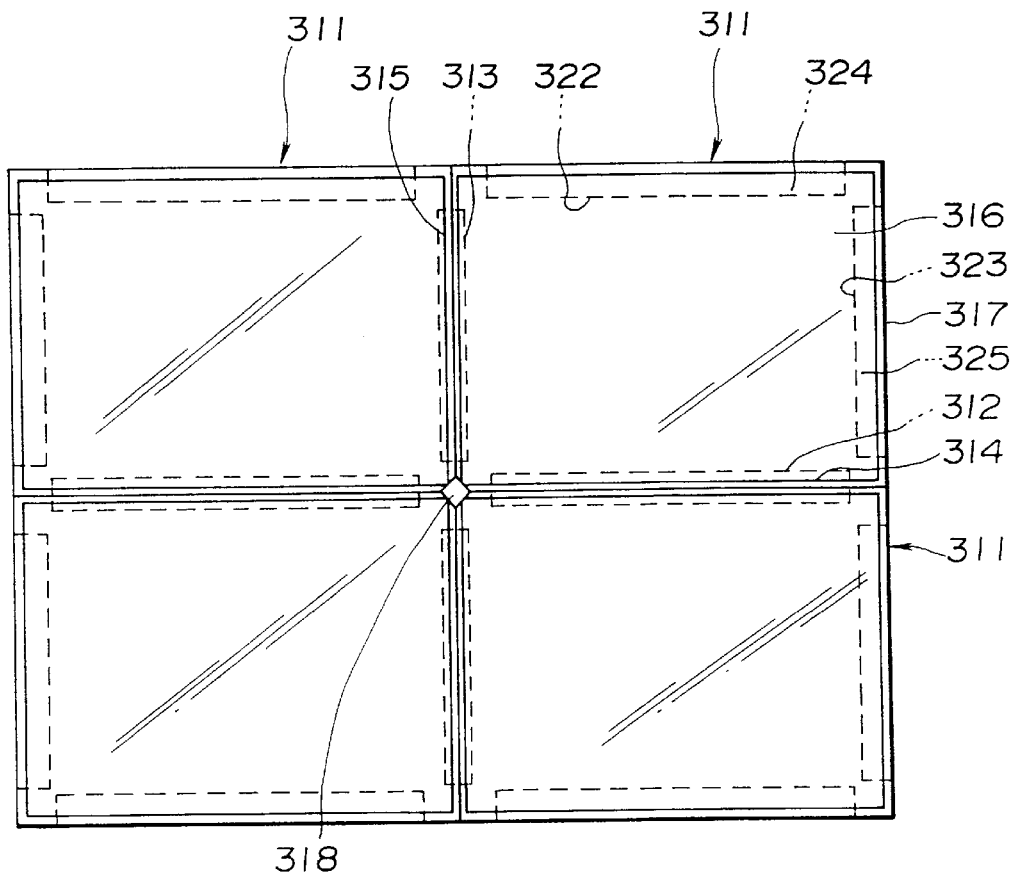
FIG. 46 is an elevation of a Fresnel lens fitting unit showing the tenth embodiment of a multiscreen display of the present invention.

FIG. 46 is an elevation of the Fresnel lens fitting unit, showing the tenth embodiment of a multiscreen display of the present invention.

As shown in FIG. 46, groove parts are formed on the outer peripheries of the Fresnel lenses 315 of the Fresnel lens fitting units 311 and the locking pieces 314, 315, 324 and 325 of the pads 312, 313, 322 and 323 are inserted in these groove parts. The locking pieces 314 and 315 of the pads 312 and 313 positioned on the surfaces adjacent to each other of the Fresnel lens fitting units 311 are formed to be shorter in the width to the Fresnel lens 316 side than the locking pieces 324 and 325 of the pads 322 and 323 of the pad 12 positioned on the outer periphery. The Fresnel lens 316 and Fresnel lens fitting frame 317 in the overlapping part of the corners of the Fresnel lens fitting units 311 are cut off and a square through 318 is formed in this part.

Figure 47:
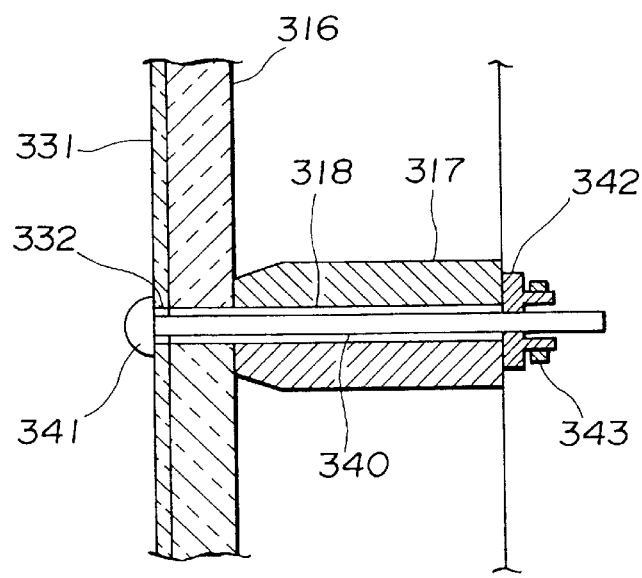
FIG. 47 is a sectioned view showing an essential part of the embodiment in FIG. 46.

FIG. 47 is a sectioned view showing the essential part of the embodiment in FIG. 46.

As shown in FIG. 47, a through hole 322 is formed in the position corresponding to the above mentioned through hole 318 of the lenticular lens 331. A pin 340 is inserted in the through holes 318 and 332 from the front surface side. A flange 341 of a diameter larger than of the through hole 332 is formed on the front surface side of the pin 340. A partly cut-off ring-shaped fastening metal fixture is fitted to the part projecting out of the back surface side of the Fresnel lens fitting frame 317 of the pin 340. The fastening metal fixture 342 will be fitted and fixed to the other end side of the pin 340 by a rubber ring 343 when the distance from the flange is well shortened. Thereby, the lenticular lens 331 will be pressed into contact with the Fresnel lens 331.

According to such embodiment, there are the same effects as in the embodiment in FIG. 39, even in case the picture is formed to be large, the lenticular lens 331 will be able to be prevented from flexing and to be pressed into contact with the Fresnel lens 316, the external light will be able to be prevented from being seen as partly reflected by the flexing of the lenticular lens and the image will be able to be prevented from being seen as distorted.

Figure 48:
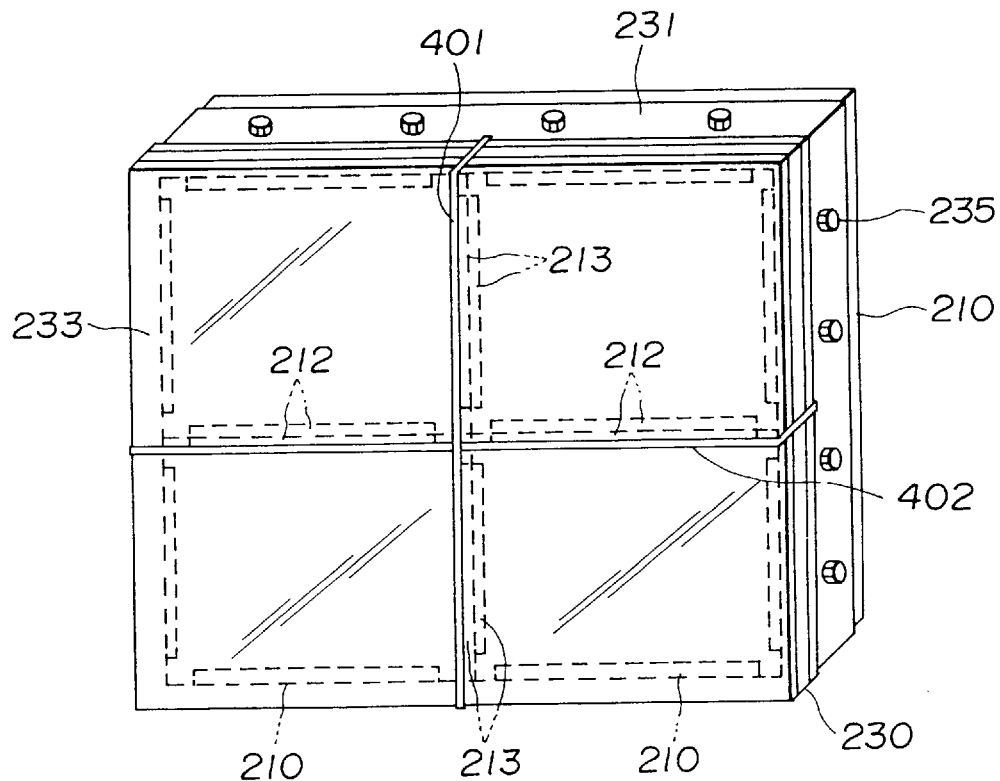
FIG. 48 is a perspective view showing the 11th embodiment of a multiscreen display of the present invention.

FIG. 48 is a perspective view showing the 11th embodiment of a multiscreen display of the present invention. The same components as in the embodiments shown in FIGS. 31 to 38 shall bear the same reference numerals and shall not be explained.

In FIG. 48, a wire 401 is fitted at one end to the central part on the upper side of the lenticular lens fitting frame 231, is fitted at the other end to the central part on the lower side of the lenticular lens fitting frame 231, and is stretched in the intermediate part to the front surface side of the lenticular lens 233 coinciding with the contact surface of the adjacent pad 213 in the vertical direction.

A wire 402 is fitted at one end to the central part on the right side of the lenticular lens fitting frame 231, is fitted at the other end to the central part on the left side of the lenticular lens fitting frame 231 and is stretched in the intermediate part to the front surface side of the lenticular lens 233 coinciding with the contact surface of the adjacent pad 212 in the horizontal direction.

Figure 49:
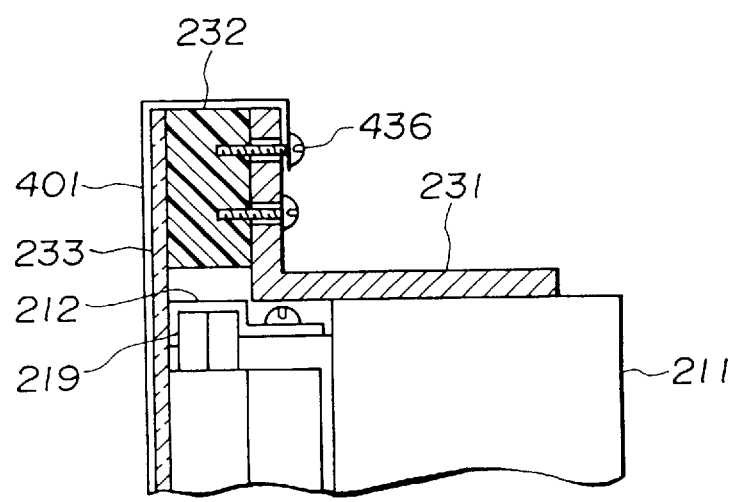
FIG. 49 is a sectioned view showing a wire fitting part in FIG. 48.

FIG. 49 is a sectioned view of the wire fitting part in FIG. 48. The same components as in the embodiments shown in FIGS. 31 to 38 shall bear the same reference numerals and shall not be explained.

As shown in this drawing, the lenticular lens fitting frame 231 of the lenticular lens fitting unit 230 is formed to be L-shaped with the front surface side directed outside and a reinforcing piece 232 is screwed and fixed to this part with screws 436. The wire 401 on one end side is wound and tied between the screw head of the screw 436 and the lenticular lens fitting frame 231 so as to be fitted to the central part on the upper side of the lenticular lens fitting frame 231. Though not illustrated, the wire 401 at the other end and the wire 402 at one end and the other end are fitted in the same manner as in the wire 401.

According to such embodiment, the same effects as in the embodiment in FIG. 46 can be obtained with the low cost wires 401 and 402. Here, the wires 401 and 402 are provided in the positions overlapping the pads 212 and 213 and therefore can be made well inconspicuous.

Figure 50:
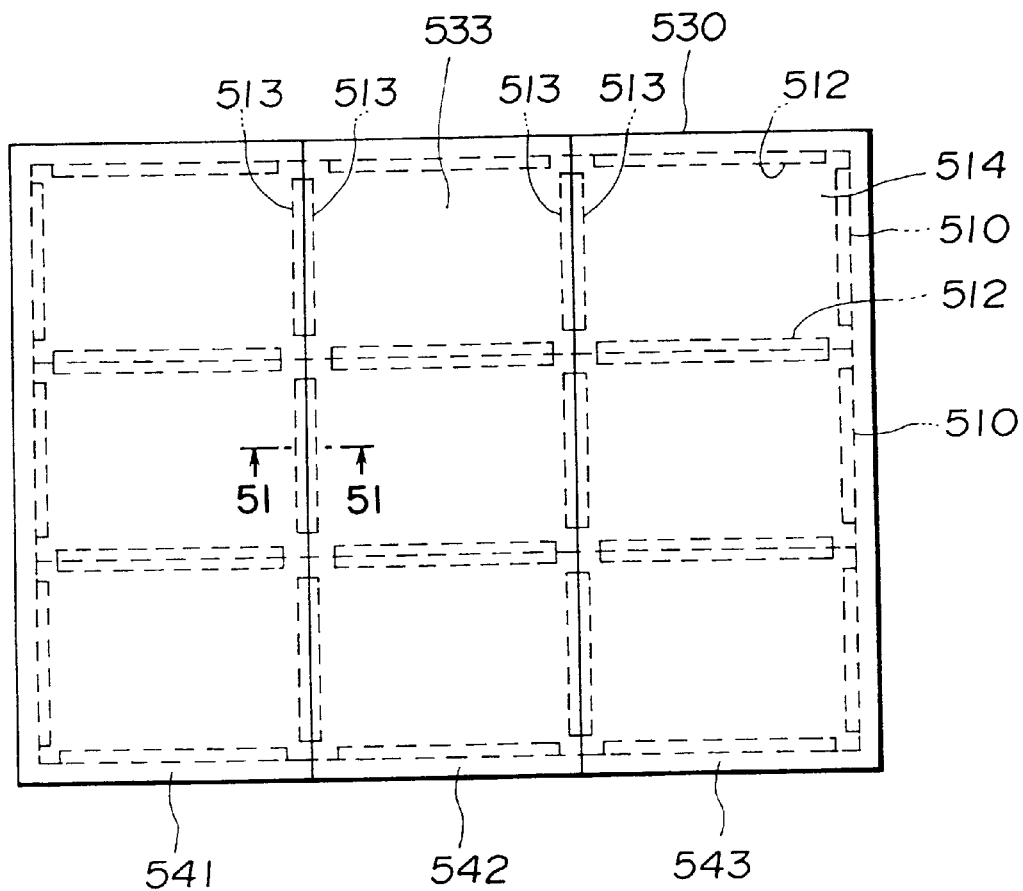
FIG. 50 is a perspective view showing the 12th embodiment of a multiscreen display of the present invention.

FIG. 50 is a perspective view showing the 12th embodiment of a multiscreen display of the present invention.

In FIG. 50, the lenticular lens fitting unit 530 as having the Fresnel lens fitting units 510 as assembled in three vertical rows and three horizontal rows inserted from the back surface side is fitted to the Fresnel lens fitting units 510. The Fresnel lens fitting unit 510 is fitted with the Fresnel lens 514 by the upper and lower pads 512 and the right and left pads 513 on the front surface side of the Fresnel lens fitting frame 211.

The lenticular lens 533 is divided into three lenticular lenses 541, 542 and 543 by dividing tangential lines in the vertical direction overlapping on the contact surfaces of the right and left pads 513 and is fitted on the Fresnel lens fitting unit 510 by using the lenticular lens fitting frame.

Figure 51:
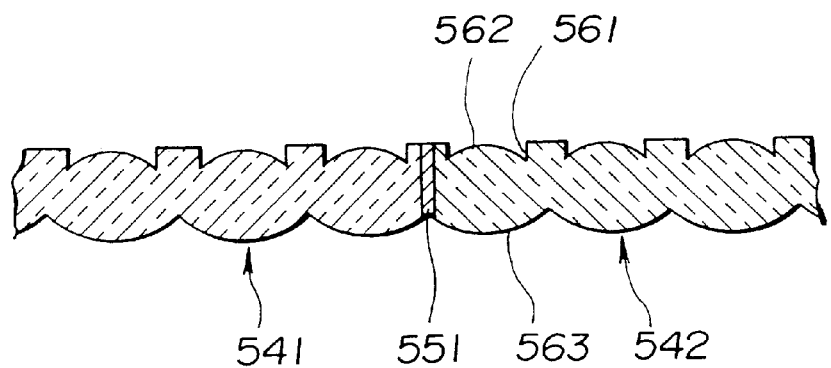
FIG. 51 is a sectioned view on line 51—51 of a lenticular lens in FIG. 50.

FIG. 51 is a sectioned view on line 51—51 of the lenticular lens shown in FIG. 50.

The lenticular lenses 541 and 542 are bonded with each other by a bonding agent 551.

On the front surface side of the lenticular lenses 541 and 542, a plurality of groove parts 561 in the vertical direction are formed as arranged on the right and left. The bottom part of this groove part 561 is formed to be an arcuate projection 562.

On the back surface side of the lenticular lenses 541 and 542, a plurality of arcuate projections 563 in the vertical direction are formed as arranged.

According to such embodiment, there are the same effects as in the embodiment in FIG. 31. In case the multiscreen is made for a large picture, the lenticular lens will have to be formed as divided into a plurality so as to be die-formed. In such case, the joint (bonded part by the bonding agent 551) will be able to be made inconspicuous.

Figure 52:
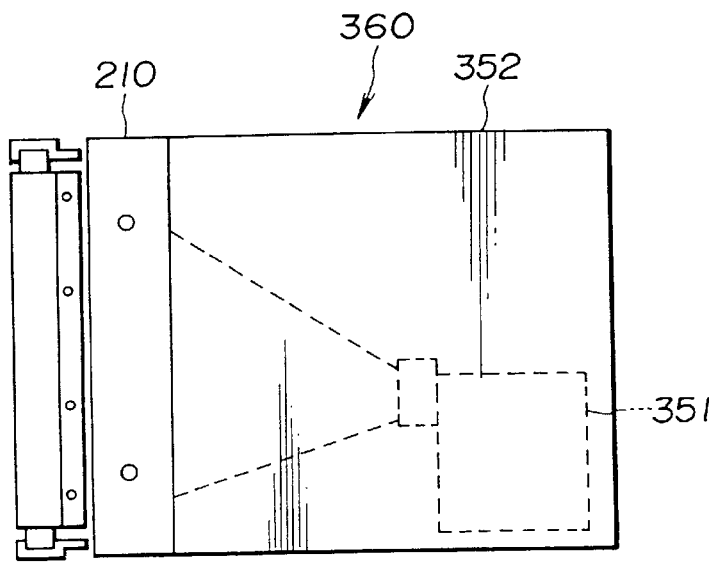
FIG. 52 is a side view showing the 13th embodiment of a multiscreen display of the present invention.
Figure 53:
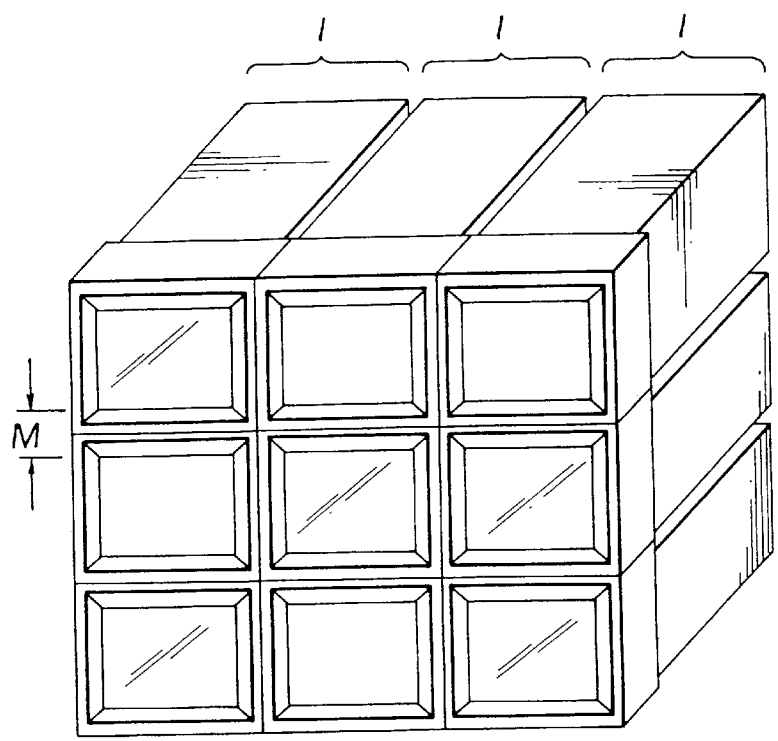
FIG. 53 is a perspective view showing a conventional multiscreen display.
Figure 54:
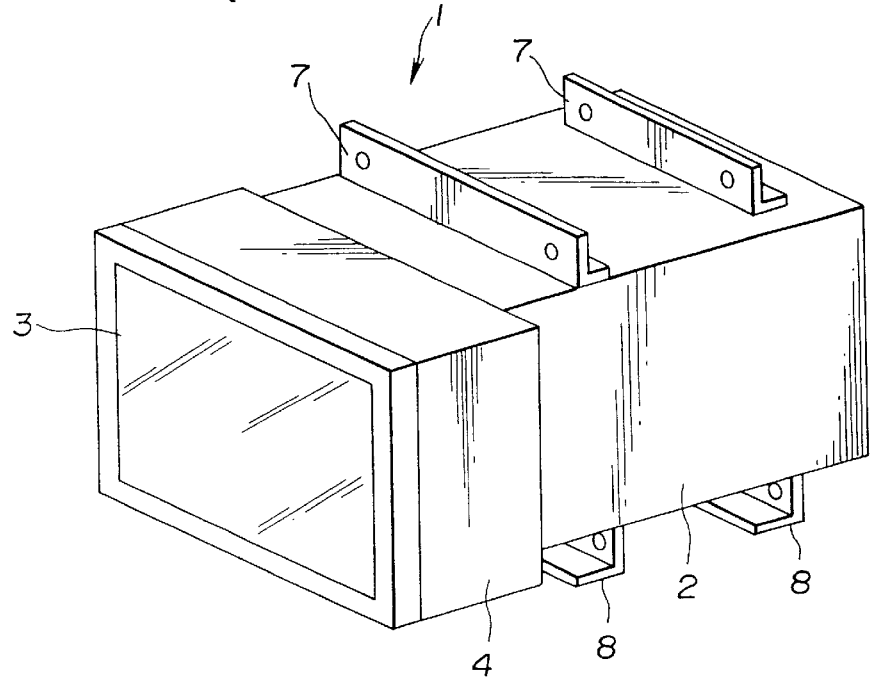
FIG. 54 is an appearance view showing an example of unit display.
Figure 55:
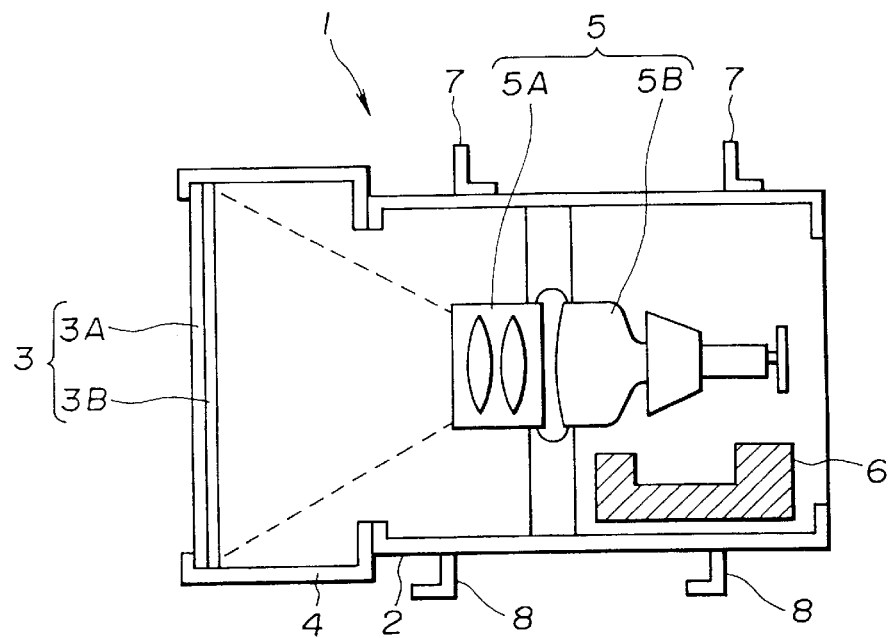
FIG. 55 is a vertically sectioned view of FIG. 54.
Figure 56:
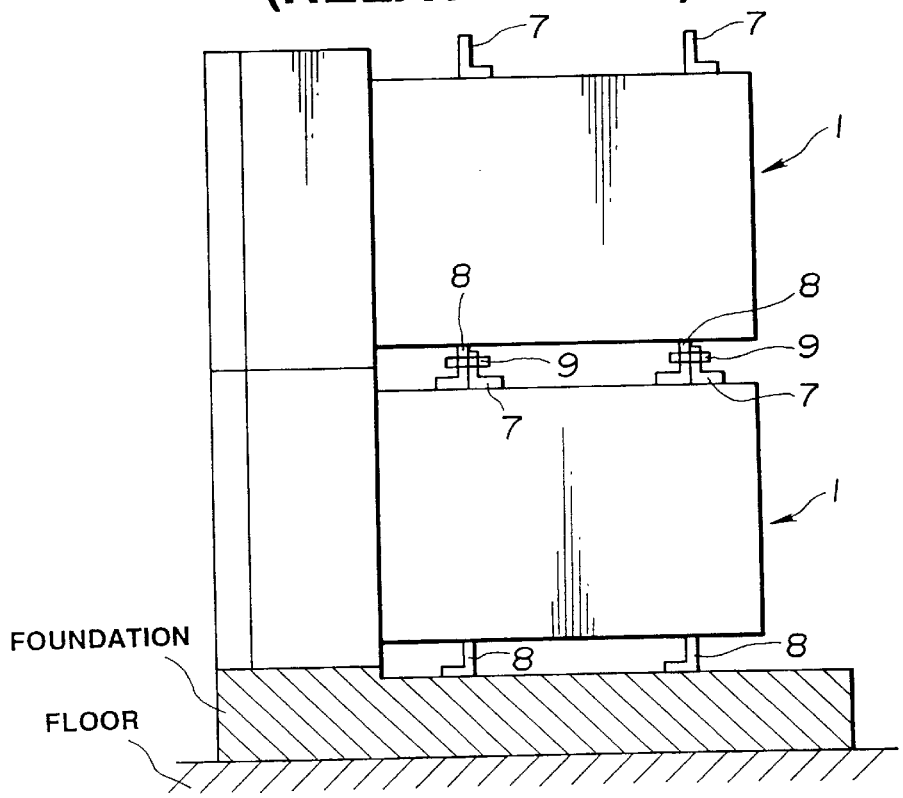
FIG. 56 is a side view of unit displays as stacked in steps.

FIG. 52 is a side view showing a unit display in the 13th embodiment of a multiscreen display of the present invention.

In this embodiment, a projecting unit 351 is inserted in an individual cabinet 352 and the same Fresnel lens fitting unit 210 as in FIG. 31 is fitted to the front surface side of this cabinet to form a single unit display 360. In this embodiment, the unit displays 360 are assembled vertically and horizontally and further the lenticular lens fitting units 230 in FIG. 31 are fitted. The connecting means for connecting and assembling a plurality of unit displays 360 vertically and horizontally may be provided at least in either of the cabinet 352 and Fresnel lens fitting unit 210.

According to such embodiment, there are the same effects as in FIG. 31 and, if the multiscreen display is assembled as in FIG. 52 and the optical position such as focusing is finely adjusted in the factory, the fine adjustment and installing operation in the setting place will be able to be simplified.

By the way, in the embodiments shown in FIGS. 31 to 49 and FIG. 52, the front surface part of the multiscreen display is formed of a total of four of Fresnel lens fitting units of two vertical rows and two horizontal rows. However, the arrangement and number of the Fresnel lens fitting units may be separately set. For example, the front surface part may be formed of a total of nine Fresnel lens fitting units of three vertical rows and three horizontal rows. In the embodiments shown in FIGS. 50 and 51, the front surface part of the multiscreen display is formed of a total of nine Fresnel lens fitting units of three vertical rows and three horizontal rows. However, the arrangement and number of the Fresnel lens fitting units may be separately set. For example, the front surface part may be formed of a total of 16 Fresnel lens fitting units of four vertical rows and four horizontal rows. Also, in the embodiments shown in FIG. 48, a wire is used as a linear member to be stretched on the front surface side of the lenticular lens 33 but another linear member such as a thread of synthetic fibers may be used.

According to the above described embodiments in FIGS. 31 to 52, even when the lag of the image light from the projecting unit is large, the interference with the image light will be able to be prevented and, in case the picture is made large, the handlability will be able to be improved.

By the way, the present invention is not limited to only the above described embodiments but can be variously modified and worked without deviating from the subject matter of the invention.

What is claimed is:

1. A multiscreen display comprising:
   a predetermined number of unit displays arranged in vertical and horizontal directions within a cabinet, each of said unit displays including:
   a first part having a screen for displaying an image;
   a second part having a light box for magnifying and projecting an image on said screen, an outside dimension of said second part being smaller than an inside dimension of said first part; and
   a plurality of shafts movable forward and rearward being inserted through said first part, a first end of each shaft having a regulator regulating rearward movement of said second part with respect to said first part, a second end of each shaft being fixed to said second part,
   wherein said second part is movable and containable inside said first part with the movement of said shaft, and further wherein the light box contained in the second part opposes the screen contained in the first part, so that the image projected from the light box may be projected directly onto the screen.

2. A multiscreen display comprising:

a predetermined number of unit displays arranged in vertical and horizontal directions within a cabinet, each of said unit displays comprising:

a light box magnifying and projecting an image;

a screen upon which the image is projected;

a first cabinet containing the screen;

a second cabinet containing said light box, an outside dimension of said second cabinet being smaller than an inside dimension of said first cabinet, said second cabinet being movable and containable inside said first cabinet, wherein the light box contained in the second cabinet opposes the screen contained in the first cabinet, so that the image projected from the light box may be projected directly onto the screen;

a plurality of shafts movable forward and rearward with respect to said first cabinet;

a regulator provided at a first end of at least one of said shafts to regulate rearward movement;

a fixing device for fixing a second end of at least one of said shafts to said second cabinet;

a guide for fixing said second cabinet in a predetermined position with respect to said first cabinet and for guiding movement of at least one of said shafts, said guide having a fixed length that is shorter than a length of said movable shafts, and being secured in a rear end of said second cabinet; and a securing device for securing said guide in a rear end part of said second cabinet.

3. A multiscreen display according to claim 2, wherein said securing device includes a flanged bolt fixed to a rear end of said guided shaft and fixed to said rear end of said second cabinet.

4. A display comprising:

a first part having a screen for displaying an image;

a second part having a light box for magnifying and projecting an image on said screen, an outside dimension of said second part being smaller than an inside dimension of said first part; and a plurality of shafts movable forward and rearward being inserted through said first part, a first end of each shaft having a regulator for regulating the rearward movement of said second part with respect to said first part, a second end of each shaft being fixed to said second part, wherein said second part is movable and containable inside said first part with the movement of said shaft, and further wherein the light box contained in the second part opposes the screen contained in the first part, so that the image projected from the light box may be projected directly onto the screen.

5. A display comprising:

a light box magnifying and projecting an image;

a screen on which said image is projected;

a first cabinet containing said screen;

a second cabinet containing said light box, an outside dimension of said second cabinet being smaller than an inside dimension of said first cabinet, said second cabinet being movable and containable inside said first cabinet, wherein the light box contained in the second cabinet opposes the screen contained in the first cabinet, so that the image projected from the light box may be projected directly onto the screen;

a plurality of shafts movable forward and rearward with respect to said first cabinet;

a regulator provided at a first end of at least one shaft of said shafts for regulating the rearward movement;

a fixing device for fixing a second end of said shaft to said second cabinet;

a guide for fixing said second cabinet in a predetermined position with respect to said first cabinet and for guiding the movement of at least one of said shafts, the guide having a fixed length that is shorter than a length of the movable shafts, and being secured in a rear end of said second cabinet; and a securing device for securing said guide means to the rear end of said second cabinet.

6. A display according to claim 5, wherein said securing device includes a flanged bolt fixed to the rear end of the guided shaft and fixed to the rear end of said second cabinet.

* * * * *